(12) United States Patent
Subramonyam et al.

(10) Patent No.: US 10,546,409 B1
(45) Date of Patent: Jan. 28, 2020

(54) ANIMATION PRODUCTION SYSTEM

(71) Applicant: ADOBE INC., San Jose, CA (US)

(72) Inventors: Hariharan Subramonyam, Ann Arbor, MI (US); Eytan Adar, Ann Arbor, MI (US); Lubomira Assenova Dontcheva, Seattle, WA (US); Wilmot Wei-Mau Li, Seattle, WA (US)

(73) Assignee: Adobe Inc., San Jose, CA (US)

( * ) Notice: Subject to any disclaimer, the term of this patent is extended or adjusted under 35 U.S.C. 154(b) by 4 days.

(21) Appl. No.: 16/057,668

(22) Filed: Aug. 7, 2018

(51) Int. Cl.
*G06T 13/40* (2011.01)
*G10L 15/22* (2006.01)
*G06F 17/27* (2006.01)

(52) U.S. Cl.
CPC ............ *G06T 13/40* (2013.01); *G10L 15/22* (2013.01); *G06F 17/272* (2013.01); *G06T 2213/08* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,674,998 B1 * | 3/2014 | Schnitzer | ........... | G06T 15/20 345/475 |
| 2004/0201612 A1 * | 10/2004 | Hild | ............. | H04L 41/22 715/736 |
| 2010/0296706 A1 * | 11/2010 | Kaneda | ............. | G06K 9/00281 382/118 |
| 2015/0253978 A1 * | 9/2015 | Ma | ............. | G06T 11/206 715/771 |

OTHER PUBLICATIONS

Barnes, C., Jacobs, D. E., Sanders, J., Goldman, D. B., Rusinkiewicz, S., Finkelstein, A., & Agrawala, M. (Dec. 2008). Video puppetry: a performative interface for cutout animation. In ACM Transactions on Graphics (TOG) (vol. 27, No. 5, p. 124). ACM.

(Continued)

*Primary Examiner* — Michelle Chin
(74) *Attorney, Agent, or Firm* — Shook, Hardy & Bacon, L.L.P.

(57) ABSTRACT

Techniques described herein relate to a streamlined animation production workflow that integrates script drafting, performance, and editing. A script including animation events is parsed to encode the animation events into nodes of a story model. The animation events are automatically triggered by a performance as a playhead advances through the story model and identifies active node(s). A command interface accepts various commands that allow a performer to act as a director by controlling recording and playback. Recording binds a generated animation event to each active node. Playback triggers generated animation events for active nodes. An animated movie is assembled from the generated animation events in the story model. The animated movie can be presented as a live preview to provide feedback to the performer, and a teleprompter interface can guide a performer by presenting and advancing the script to follow the performance.

20 Claims, 12 Drawing Sheets

(56) References Cited

OTHER PUBLICATIONS

Berthouzoz, F., Li, W., & Agrawala, M. (2012). Tools for placing cuts and transitions in interview video. ACM Trans. Graph., 31(4), 67-1.

Brand, M. (Jul. 1999). Voice puppetry. In Proceedings of the 26th annual conference on Computer graphics and interactive techniques (pp. 21-28). ACM Press/Addison-Wesley Publishing Co..

Breitfuss, W., Prendinger, H., & Ishizuka, M. (Nov. 2007). Automated generation of non-verbal behavior for virtual embodied characters. In Proceedings of the 9th international conference on Multimodal interfaces (pp. 319-322). ACM.

Casares, J., Long, A. C., Myers, B. A., Bhatnagar, R., Stevens, S. M., Dabbish, L., . . . & Corbett, A. (Jun. 2002). Simplifying video editing using metadata. In Proceedings of the 4th conference on Designing interactive systems: processes, practices, methods, and techniques (pp. 157-166). ACM.

Cohen, M. M., & Massaro, D. W. (1993). Modeling coarticulation in synthetic visual speech. In Models and techniques in computer animation (pp. 139-156). Springer, Tokyo.

Cosker, D., & Edge, J. (2009). Laughing, crying, sneezing and yawning: Automatic voice driven animation of non-speech articulations. Proceedings of Computer Animation and Social Agents, CASA, 225-234.

Dontcheva, M., Yngve, G., & Popović, Z. (Jul. 2003). Layered acting for character animation. In ACM Transactions on Graphics (TOG) (vol. 22, No. 3, pp. 409-416). ACM.

Google. (2018). Cloud Text-to-Speech. Retrieved from the Internet at <https://web.archive.org/web/20180327192234/https://cloud.google.com/text-to-speech/>. 6 pages.

Gutierrez-Osuna, R., Kakumanu, P. K., Esposito, A., Garcia, O. N., Bojórquez, A., Castillo, J. L., & Rudomín, I. (2005). Speech-driven facial animation with realistic dynamics. IEEE transactions on multimedia, 7(1), 33-42.

Hassani, K., & Lee, W. S. (2016). Visualizing natural language descriptions: A survey. ACM Computing Surveys (CSUR), 49(1), 17. arXiv:1607.00623v1.

Laput, G. P., Dontcheva, M., Wilensky, G., Chang, W., Agarwala, A., Linder, J., & Adar, E. (Apr. 2013). PixelTone: a multimodal interface for image editing. In Proceedings of the SIGCHI Conference on Human Factors in Computing Systems (pp. 2185-2194). ACM.

Marti, M., Vieli, J., Witoń, W., Sanghrajka, R., Inversini, D., Wotruba, D., . . . & Gross, M. (Mar. 2008). CARDINAL: Computer Assisted Authoring of Movie Scripts. In 23rd International Conference on Intelligent User Interfaces (pp. 609-519). ACM.

Nguyen, N., Wheatland, N., Brown, D., Parise, B., Liu, C. K., & Zordan, V. (Jul. 2010). Performance capture with physical interaction. In Proceedings of the 2010 ACM SIGGRAPH/Eurographics Symposium on Computer Animation (pp. 189-195). Eurographics Association.

Parrott, N. 2018. Commanding. https://github.com/nate-parrott/commanding. (2018).

Pavel, A., Goldman, D. B., Hartmann, B., & Agrawala, M. (Nov. 2015). Sceneskim: Searching and browsing movies using synchronized captions, scripts and plot summaries. In Proceedings of the 28th Annual ACM Symposium on User Interface Software & Technology (pp. 181-190). ACM.

Rubin, S., Berthouzoz, F., Mysore, G. J., & Agrawala, M. (Nov. 2015). Capture-time feedback for recording scripted narration. In Proceedings of the 28th Annual ACM Symposium on User Interface Software & Technology (pp. 191-199). ACM.

Rubin, S., Berthouzoz, F., Mysore, G. J., Li, W., & Agrawala, M. (Oct. 2013). Content-based tools for editing audio stories. In Proceedings of the 26th annual ACM symposium on User interface software and technology (pp. 113-122). ACM.

Shen, J., Aoki, T., & Yasuda, H. (Aug. 2004). EMM Software System: Electronic Movie Making from Screenplay. IPSJ SIG Technical Report (pp. 51-56). IPSJ.

Shin, H. V., Li, W., & Durand, F. (Oct. 2016). Dynamic authoring of audio with linked scripts. In Proceedings of the 29th Annual Symposium on User Interface Software and Technology (pp. 509-516). ACM.

Sturman, D. J. (1998). Computer puppetry. IEEE Computer Graphics and Applications, 18(1), 38-45.

Wang, Z., & van de Panne, M. (Sep. 2006). Walk to here: a voice driven animation system. In Proceedings of the 2006 ACM SIGGRAPH/Eurographics symposium on Computer animation (pp. 243-251). Eurographics Association.

Willett, N. S., Li, W., Popovic, J., & Finkelstein, A. (Oct. 2017). Triggering Artwork Swaps for Live Animation. In Proceedings of the 30th Annual ACM Symposium on User Interface Software and Technology (pp. 85-95). ACM.

* cited by examiner

ANIMATION PRODUCTION SYSTEM

BACKGROUND

Computer animation is a process for digitally generating animated images. For example, various animation techniques such as frame-by-frame animation, keyframing, procedural animation, behavioral animation, dynamic animation, and motion capture can be used to give life to animated objects. Modern techniques often focus on improving the methods by which to capture and process human geometry, appearance, expression, and motion. For example, performance animation systems can generate character animations directly from actor performances, and have thereby significantly enhanced the workflow of animation production.

Capturing and processing character motion, however, is only one part of creating compelling animated stories. Other aspects of animation production can include authoring a script, coordinating actors, recording performances, and editing a collection of recorded performances into an animated movie. Recent developments in performance animation systems help to streamline the animation production workflow, making it easier to generate animated characters and animated stories. For example, using performance animation, actors can directly create a corresponding character animation by simply acting out their characters. This approach is now part of professional workflows in which one or more I/O components and accompanying software translate physical motion and audio into character animation.

SUMMARY

Techniques described herein involve a script-driven approach to recording and producing performance-based animated movies using a streamlined animation production workflow that integrates script drafting, performance, and editing. At a high level, a script can be drafted to indicate animation events (e.g., dialog and on-screen performance behaviors for characters, sets, camera, and sound) and the temporal relationships among the animation events. The script is parsed to identify lines of dialog and corresponding animation events, and the lines of dialog and animation events are encoded into nodes of a story model. As a performer acts out the script, the performance is interpreted and aligned with the story model, and the animation events indicated in the script are generated. Generated animation events can be audio recordings, animations generated based on captured performance, or some other synthesized animation effect. The generated animation events are associated with corresponding nodes in the story model. Using the story model, animation events identified in the script can be automatically triggered by a performance as a playhead advances through corresponding nodes in the story model.

During recording and playback modes, the playhead traverses the story model and identifies an active node(s) within the story model. Recording binds an associated animation event to each active node. For example, a recorded performance can be converted into recorded audio (for speech nodes) or an animation (for motion nodes). Playback plays any recorded content for active nodes as the playhead advances through the story model. During playback, recorded content for each active node is triggered as the playhead traverses the story model, speech and non-speech events (e.g., sound effects, motions, etc.) can be synthesized for unrecorded nodes, and unrecorded nodes that require an explicit user performance are skipped.

To facilitate recording and playback, a command interface can accept various input commands that allow a performer to act as a director by controlling various aspects of recording and playback. In some embodiments, voice-based commands can be used to drive character motion, re-recording takes (e.g., to fix mistakes or try different voicings), a variety of recording modes (e.g., recording a script in order, one character at a time, etc.), automatic assembly of takes into an animated movie, and the like. To support voice commands, transcribed text can be compared to one or more speech nodes (e.g., an active node) in the story model to identify speech that is and is not part of the scripted dialog. Transcribed speech that is determined to be part of the scripted dialog (e.g., within a tolerance) can be used as an indication to advance the playhead. Otherwise, transcribed speech may be parsed to identify a command from the transcribed speech. In this manner, the command interface allows a performer to navigate the story model (and therefore the script) to coordinate complex production functions that were not previously available. For example, a performer can now issue a command (e.g., a voice command) during a vocal performance to retake a performance of scripted dialog, record character motion out of order, and layer animation on top of previously recorded content.

An animated movie can be assembled from the story model (e.g., from the generated animation events associated with the nodes in the story model). For example, the generated animation events can be automatically assembled into an animated movie (e.g., during a performance), and the animated movie can be presented as a live preview to provide feedback to the performer. Meanwhile, a teleprompter interface can guide a performer by presenting and advancing the script to follow the performance. In this manner, a rough cut of the whole animation movie can be automatically assembled, for example, in one pass. Techniques described herein facilitate a broad array of animation scenarios including individual performance, collaborative authoring, layered animation, and semi-automated story telling.

BRIEF DESCRIPTION OF THE DRAWINGS

The present invention is described in detail below with reference to the attached drawing figures, wherein.

DETAILED DESCRIPTION

Overview

Figure 1:
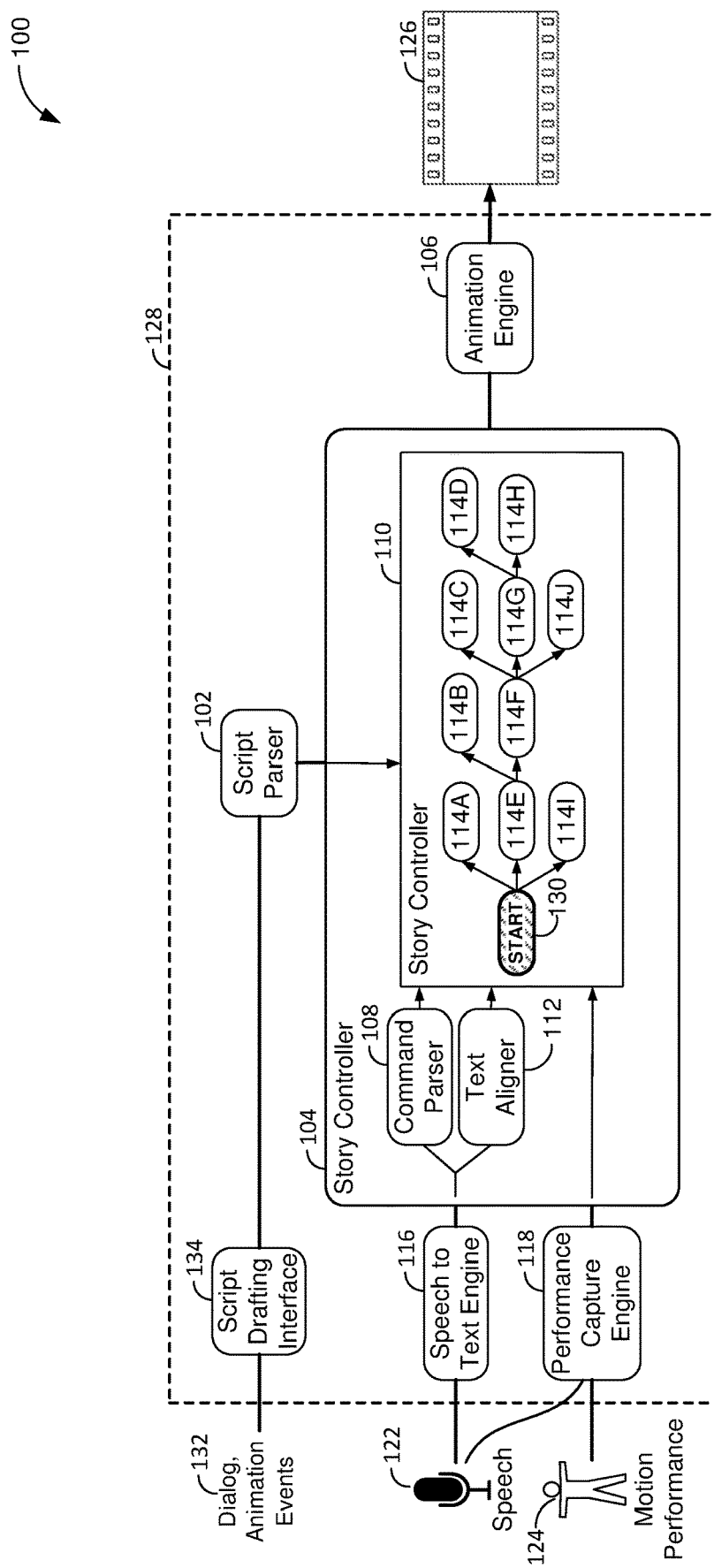
FIG. 1 is a schematic diagram of an example animation production environment, in accordance with embodiments of the present invention.

Animated movies can be challenging to create. Performance-based animation systems (such as ADOBE® Character Animator) can simplify certain aspects of animation production, for example, by automatically generating mouth animations that match what a user says. However, performers typically control the many aspects of a character's motion (e.g., facial expression, body pose, etc.) either by multiple performers simultaneously recording performances for multiple characters, or using multiple layered performances ("takes") that requires manually assembling the multiple takes together using low-level timeline editing operations. Each of these techniques can be time consuming, inefficient, and susceptible to human error.

Moreover, performance is not the only task in creating an animated movie. Generally, the conventional animation production workflow is defined by several stages. These stages can include authoring a script, coordinating actors, recording performances, and editing a collection of recorded performances to generate a complete animated movie. Each of these steps is time-consuming and creates barriers to efficient animation production.

Further, the conventional animation production workflow typically occurs in sequence. That is, each of the steps in the animation production workflow (e.g., script drafting, performance recording, performance editing) is traditionally completed one at a time. As a result, earlier tasks in the workflow are unable to benefit from information received during, or otherwise representative of, later stages in the animation production workflow. For example, a script writer may not know whether a particular dialog or action will work well for a particular actor, or whether a performance animation will work well in a particular scene (e.g., whether a high-five or a fist-bump will work better in a particular scene). Moreover, upstream changes generally require downstream work to be redone by hand. These limitations increase the time and cost of creating and iterating animated movies. They also introduce friction into the animation production workflow, ultimately slowing down valuable design iterations.

Prior improvements to performance animation systems focus on ways to control animated characters, change scenes, or control camera zoom using gestures and motion capture. Some performance animation systems can use detected audio to generate certain aspects of animated characters, for example, by automatically generating corresponding mouth animations (i.e., lip sync) or hand gestures for a character. However, these techniques do not allow a performer to use voice commands to control other types of character motions or to trigger other animated effects unrelated to a character (e.g., change in camera angle, scene change, etc.).

More generally, voice-based interfaces have simplified creative editing tasks by abstracting interface complexity. For example, some video scrubbing and editing systems allow a user to issue a semantic query to identify a particular animation frame in a recording by searching for a match in a corresponding transcript. Other techniques have combined spoken input with a physical input (e.g., mouse pointer input) to direct actions of animated characters (e.g., "walk to here"). This approach supports voice-based system commands for selecting characters, character actions/animations, starting and ending a recording, and playback controls. However, in these systems, speech input cannot be used to navigate a script or perform more complex production functions. As such, conventional voice-based interfaces for animation production currently support a very limited set of production commands, limiting the efficiency of a performer's interactions with a production interface. These and other variations and combinations of shortcomings exist with conventional animation production systems.

Accordingly, techniques described herein involve a script-driven approach to recording and producing performance-based animated movies using a streamlined animation production workflow that integrates script drafting, performance, and editing. At a high level, a script can be drafted to indicate animation events (e.g., dialog and on-screen performance behaviors for characters, sets, camera, and sound) and the temporal relationships among the animation events. The script is parsed to identify lines of dialog and corresponding animation events, and the lines of dialog and animation events are encoded into a story model. As a performer acts out the script, the performance is interpreted and aligned with the story model. More specifically, the animation events indicated in the script are generated (e.g., as audio recordings, animations generated based on a captured performance, or some other synthesized animation effect), and the generated animation events are associated with corresponding nodes in the story model. As such, animation events identified in the script can be automatically triggered by a performance as a playhead advances through corresponding nodes in the story model.

An animated movie can be assembled from the story model (e.g., from the generated animation events associated with the nodes in the story model). For example, the generated animation events can be automatically assembled into an animated movie, which can be presented as a live preview to provide feedback to the performer. Further, the live preview can be used to provide context for subsequent performances. In some embodiments, voice-based commands can be used to drive character motion, re-recording takes (e.g., to fix mistakes or try different voicings), a variety of recording modes (e.g., recording a script in order, one character at a time, etc.), automatic assembly of takes into an animated movie, and the like. As such, a rough cut of the whole animation movie can be automatically assembled, for example, in one pass.

Using this workflow, a broad array of animation scenarios are possible, including individual performance, collaborative authoring, layered animation, and semi-automated story telling. For example, now, even novices (e.g., children) can create animated movies simply by reading a script, or by automatically generating rough cut animations from table reads. In some embodiments, a single performer can read through a script one line at a time by recording voice and physical performance simultaneously. Additionally or alternatively, changes to the script can be detected during a performance (e.g., based on a received command or an improvisation during a performance), and the changes can be rolled into the script and/or the story model without losing prior work. Similarly, changes made to a script (e.g., through a text editor) can be propagated to previously recorded performances, where possible, to avoid users having to redo performances. For example, if a line(s) is deleted or reordered in the script, an associated recording for that line(s) can be automatically updated in the story model and/or animated movie. These are just a few examples of how integrating parts of the animation production workflow can allow animators to create and edit animated movies more efficiently than in the past.

In some embodiments, an end-to-end animation production system may be implemented. The animation production system can access a script drafted using a markup language to express dialog, other animation events, and their temporal relationships. Syntax of the markup language can indicate, among other information, when an animation event (e.g., a character motion) occurs relative to dialog, and can trigger the animation event at a designated time or when a designated event occurs (e.g., when a performer speaks a specific word or phrase during a recorded performance). In some embodiments, an existing script markup language can be extended (e.g., by embedding animation events within comments of the script language) to ensure backwards compatibility. The markup language can be used to indicate and trigger any type of animation event such as a character action/motion, secondary animations, scene changes, changes to camera angle or position, sound effects, and the like.

By way of nonlimiting example, a portion of a script that includes both dialog and syntax indicating associated animation events may read: "Welcome to chat with Jill. [[movement: jill-mid_view]]; I am from Phoenix. [[movement: background-phoenix]]; Spring is that wonderful time before the scorching summer. [[movement: jill-head_fire]]." As explained in more detail below, when a performer reads and performs this dialog, the script can be used to trigger a camera angle change when the performer says, "Welcome to chat with Jill" (as indicated by the "movement" trigger, the first argument "jill" indicating a category of movement animations relating to Jill, and the second argument "mid_view" indicating a corresponding camera angle change for Jill). Similarly, the script can be used to trigger a scene change when the performer says, "I am from Phoenix," and a specified fire animation when the performer says, "Spring is that wonderful time before the scorching summer." Any variation for triggers and arguments are possible (e.g., different triggers for character animations, camera changes, and set changes, etc.)

To facilitate triggering scripted animation events by performing a corresponding scripted dialog, the script can be parsed to identify the animation events, and the animation events are encoded into a story model. The story model represents the script as a sequence of nodes, and each node represents one or more animation events such as dialog (speech nodes), character motion or animation (motion nodes), non-speech audio (sound effect nodes), transitions to pre-defined camera angles/positions (camera nodes), scene changes (scene nodes), improvisation (improvisation nodes), and the like. In some embodiments, the story model is a directed acyclic graph (DAG) that reflects temporal relationships between nodes with directed edges. As such, a story model can provide a flexible data structure that captures relationships between different animation events in a script. As explained below, this structure supports generating complex animations with multiple characters and layered animations where multiple animation events happen at the same time (e.g., one character reacts while another speaks).

At a high level, each node of the story model can have an associated generated animation event. During recording and playback modes, a playhead traverses the story model and identifies an active node(s) within the story model. Recording binds a generated animation event to each active node. For example, a recorded performance can be converted into recorded audio (for speech nodes) or an animation (for motion nodes). For nodes such as scene nodes, sound-effect nodes, and motion nodes that trigger pre-authored animation cycles, recording can simply specify a designated time when a corresponding animation event should occur. Recording over a node can replace an existing recording for that node with a new recorded performance, or store the performance as a new version. Playback plays any recorded content for active nodes as the playhead advances through the story model. During playback, recorded content for each active node is triggered as the playhead traverses story model, speech and non-speech events (e.g., sound effects, motions, etc.) can be synthesized for unrecorded nodes, and unrecorded nodes that require an explicit user performance can be skipped. Generally, playback and recording can occur separately or at the same time.

In some embodiments, a teleprompter interface can guide a performer by presenting and advancing the script to follow the performance. To accomplish this, the vocal performance can be transcribed and aligned with the script, and a corresponding portion of the script can be highlighted, selected, or otherwise indicated to the performer. Additionally or alternatively, a live preview of a corresponding animation event and/or a portion of the assembled movie corresponding to the performance can be presented in a stage view to provide feedback and context to the performer.

To facilitate recording and playback, a command interface can accept various input commands that allow a performer to act as a director by controlling various aspects recording and playback. The commands may be voice commands, commands received through a physical interface such as a keyboard or touchscreen, or otherwise. To support voice commands, transcribed text can be compared to one or more speech nodes in the story model (e.g., an active node) to identify speech that is and is not part of the scripted dialog. Various types of alignment techniques may be applied, including by matching one or more transcribed words to one or more words in a scripted dialog. Fuzzy matching can be used in order to account for errors (e.g., in performance, in transcription, etc.). Additionally or alternatively, fuzzy matching can be used to facilitate improvisation for example, with a configurable amount of tolerance. Transcribed speech that is determined to be part of the scripted dialog (within the tolerance) can be used as an indication to advance the playhead. Otherwise, transcribed speech may be parsed to identify a command from the transcribed speech.

A command is detected when the transcribed speech matches a known command. The playhead may be stopped and repositioned to a node corresponding to the detected command. Further, as explained in more detail below, the state of each node in the story model can be set to play or record, depending on the detected command. The state of each node can serve as an indicator during recording and/or playback of whether or not to record and/or playback a corresponding node. In this manner, the command interface allows a performer to navigate the story model (and therefore the script) to coordinate complex production functions that were not previously available. For example, a performer can now issue a command (e.g., a voice command), retake a performance of scripted dialog, record character motion out of order, and layer animation on top of previously recorded content. In these scenarios, not only can the command be used to start and stop recording, but the command can also be used to automatically reposition the playhead and set states for corresponding nodes in the story model to facilitate rerecording. By allowing a user to control multiple animation production functions by issuing a single command, the present command interface improves the efficiency with which a performer can interaction with an animation production system. This and other examples are explained in more detail below.

In an example embodiment, to begin recording a performance, a performer (or other user) can issue a designated voice command (e.g., "start recording") to trigger a recording. As the performance advances, a teleprompter interface highlights recorded and transcribed words that matched the script (and/or story model), while a stage interface simultaneously displays a live preview of a character animation that corresponds to the performance. By way of nonlimiting example, the performance can include a vocal performance, physical movement, facial expression, some combination thereof, and the like. In this regard, if a performer says "hello" while making a waving gesture, the stage interface will display a corresponding animated character saying "hello" while making a corresponding waving gesture.

Continuing with the example embodiment described above, the performer can issue a command to retake one or more lines of dialog by issuing one or more designated voice commands (e.g., "cut" and "let's try that again"), gestural commands (e.g., raise a hand in a stop gesture or cover the mouth), or some combination thereof (e.g., raise hand to disambiguate a command from dialogue, and say "cut"). For example, a "cut" command can stop recording. A "let's try that again" command can position the playhead in the story model (e.g., to the beginning of an active speech node, a prior speech node, a speech node identified by a detected voice command, etc.). Further, the command can set an appropriate state for corresponding nodes (e.g., by setting the designated speech node to record), reset the teleprompter interface to the beginning of an active dialog line within the script (e.g., corresponding to the designated speech), and rewind the stage interface to present the corresponding scene and character(s) at a reset state. In some embodiments, the "let's try that again" command may further trigger a re-recording at the designated active speech node. Alternatively, a separate "action" command may be required to begin recording again. In some embodiments, recording will continue after re-performing a designated speech node. In some embodiments, after re-performing a portion of dialog, a performer must issue a command to continue recording (e.g., "continue recording"). Additionally or alternatively, a command can be issued (e.g., "replay") at any time during recording to replay a recorded performance. These and other commands described herein are intended merely as examples, and any other suitable command may be implemented, whether received using a voice interface, physical interface, some combination, or otherwise.

In some embodiments, different performers can record different portions of a script that contains more than one character, and corresponding recordings of the different characters can be automatically assembled into one animated movie. Such collaborative recordings can be synchronous or asynchronous. For asynchronous situations, previously recorded performances of a first character can be presented in order to provide context for recording a performance of a second character (whether by the same or another performer). In any scenario, recordings for the multiple characters (and corresponding animations for the characters) can be automatically layered to assemble an animated movie (e.g., in real time).

In an example embodiment, a performer may designate that a recording should apply only to a designated character. As the performer acts out the script for the character, corresponding animation events can be generated, for example, by recording the performance, generating an animation from the performance (e.g., character motion), or otherwise synthesizing an animation effect (e.g., camera effects, sound effects, and the like). The generated animation events can be associated with corresponding nodes in the story model, and an animated movie can be assembled from the generated animation events. After the performance, the performer can issue a command to stop recording (e.g., "end recording"), and the process can be repeated for any number of additional characters. After the last performance is recorded (or during the last performance), each of the performances and associated animation events can be layered and assembled into a complete animated movie, and the animated movie can be published. Additionally or alternatively, a structured timeline representation of the story model can be generated, for example, to facilitate further editing and refinement in a traditional animation editing environment. In this latter example, the recorded performance may be automatically time-aligned and presented or otherwise identified in the timeline.

As such, using implementations described herein, an animator, performer, or other user can efficiently and effectively draft, perform, and/or produce animated movies. For example, an end-to-end animation production system may integrate script authoring, performing, and/or editing of animated stories. A script can be drafted using a markup language that indicates when an animation event (e.g., a character motion) occurs relative to the dialog, and can trigger the animation event during a performance of the script. To facilitate triggering scripted animation events by performing a corresponding scripted dialog, the script can be parsed to identify the animation events, and the animation events are encoded into a story model (e.g., a DAG). During recording and playback modes, a playhead traverses the story model and plays back, records or generates content for active nodes designated by the playhead. In some embodiments, a teleprompter interface can guide a performer by presenting and advancing the script to follow the performance while a live preview of is presented in a stage view.

To facilitate recording and playback, a command interface can accept various input commands that allow a performer to act as a director by controlling various aspects of recording and playback. To support voice commands, transcribed text can be compared to one or more speech nodes in the story model (e.g., an active node) to identify speech that is not part of the scripted dialogue, and may be further parsed to identify and execute a corresponding command. The command interface allows a performer to navigate the story model and the script to coordinate complex production functions that were not previously available. By allowing a user to control multiple animation production functions by issuing a single command, the present command interface improves the efficiency with which a performer can interact with an animation production system.

Utilizing the end-to-end animation production system can assist animators, performers, and other users by seamlessly integrating various steps of the traditional animation production workflow. For example, improvisation occurring during a performance can be transcribed and used to automatically update a script and/or story model without the need to rerecord or reassemble an animated movie. As a result, techniques described herein effectively short circuit some of the steps in the conventional animation production workflow, improving the efficiency of animation production.

Having briefly described an overview of aspects of the present invention, various terms used throughout this description are provided. Although more details regarding various terms are provided throughout this description, general descriptions of some terms are included below to provider a clearer understanding of the ideas disclosed herein.

Performance Animation—Performance animation generally refers to the process of automatically creating a character animation from actor performance. Performance animation gives life to an object in computer graphics by capturing and processing human geometry, appearance, expression, and motion. By way of nonlimiting example, if a performance comprises a user saying "hello" while making a waving gesture, audio and physical motion of the performance can be captured and used to generate an animated character saying "hello" while making a waving gesture.

Animation Event—An animation event is any type of on-screen behavior for a character, set, camera, sound, or the like. For example, animation events for characters can include spoken dialog and character motion. Animation events for a camera may include changes to or transitions from various camera angles and/or positions. Animation events for a set can include scene changes, secondary animations, and the like. Animation events can be generated by recording a performance (e.g., recorded audio), generating an animation from recorded content (e.g., lip sync generated from a recorded vocal performance, facial expressions or other motion generated from a recorded motion performance, etc.), and/or otherwise synthesizing an animation or other effect (e.g., synthesized audio from a script, synthesized motion using a pre-defined animation, synthesized camera effects, synthesized set changes, synthesized sound effects, etc.).

Story Model—A story model generally refers to a representation of a script as a sequence of nodes. The nodes of a story model can represent one or more animation events, such as dialog (speech node), character motion or animation (motion node), non-speech audio (sound effect nodes), transitions to pre-defined camera angles/positions (camera node), scene changes (scene node), improvisation (improvisation node), and the like. The nodes of the story model are associated with one another in a manner that reflects the temporal relationships among the animation events. In some embodiments, the story model is a directed acyclic graph (DAG) that reflects temporal relationships between nodes with directed edges. In this manner, a story model encodes dialog, character actions, scene changes, and other animation events into a logical representation.

Teleprompter Interface—A teleprompter interface generally refers to a portion of a graphical user interface such as a display window that presents dialog from a script. During a performance, a teleprompter interface can guide a user by advancing the dialog, a cursor, and/or another indicator as a user speaks. For example, in some embodiments, as a user performs, an interactive teleprompter interface (and/or supporting components) can detect spoken words, match corresponding words in the script being read, and highlight the matched words on the teleprompter interface in real time.

Stage Interface—A stage interface generally refers to a portion of a graphical user interface that presents a live preview of an animated movie during a live performance. For example, in some embodiments, as a performer acts out a character, a corresponding portion of an animated movie, including a character animation that corresponds to the performance, can be synthesized from the performance in real time and presented on the stage interface as a live preview.

Collaborative Animation—Collaborative animation generally refers to a type of animation production in which different portions of a script that contains multiple characters are recorded separately by one or more users and then compiled into a single animated movie.

Asynchronous Animation—Asynchronous animation generally refers to a type of collaborative animation production in which previous recording(s) of a first character are played while a second character's action is performed and recorded. In this manner, asynchronous animation can be used to provide context for the recording of the second character.

Exemplary Animation Production Environment

Referring now to FIG. 1, an example animation production environment suitable for use in implementing embodiments of the present invention is shown. Generally, animation production environment 100 is suitable for drafting, performing, and editing animated movies. Environment 100 includes animation production system 128, which may be implemented on one or more computing devices capable of facilitating animation production, such as computing device 900, as described below with reference to FIG. 9. In embodiments, a computing device can be a personal computer (PC), a laptop computer, a workstation, server computer, a mobile computing device, a PDA, a cell phone, or the like.

As illustrated, animation production system 128 includes script drafting interface 134, script parser 102, speech to text engine 116, performance capture engine 118, story controller 104, and animation engine 106. Any or all of these components, or some portion thereof, can be incorporated, or integrated, into an application or an add-on or plug-in to an application configured to execute on a computing device. The application may generally be any application capable of facilitating animation production. The application may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One exemplary application that may be used for animation production is ADOBE® Character Animator. In some embodiments, one or more of the components of environment 100, or some portion thereof, can be additionally or alternatively integrated into an operating system (e.g., as a service) or a server (e.g., a remote server). These and other variations are contemplated within the present disclosure.

At a high level, animation production system 128 may provide script drafting interface 134 to facilitate the entry or identification of a script comprising dialog and markup indicating corresponding animation events 132. Script parser 102 parses the script to identify the dialog and corresponding animation events, and encodes them into story model 110. During a performance of various parts of the script, speech 122 and motion performance 124 are captured by speech to text engine 116 and performance capture engine 118, and animation engine 106 generates corresponding animation events. Story controller 104 manages the current state of story model 110, coordinates the generation of the animation events, and binds the generated animation events to designated nodes of story model 110. Animation engine 106 assembles the generated animation events associated with the nodes of story model 110 into animated movie 126 at a designated time, for example, in real-time as the performance occurs.

Script drafting interface 134 provides an interface with which an animator, author, or other user may draft or identify a script comprising dialog and corresponding animation events 132. Conventional screenplay markup languages are used to convey and format dialog, but not other facets of animation production. A screenplay, for example, does not generally provide instructions for camera positioning or detailed animation instructions. By contrast, in some embodiments, a script writing markup language can be used to indicate animation events. In some embodiments, an existing script writing markup language can be extended, for example, by embedding animation events within comments or some other suitable structure of the script language. By embedding animation events into a comment within an existing script drafting markup language, animation production system 128 can support scripts that indicate animation events while simultaneously being backwards compatible with existing script editing software.

Furthermore, each job in the animation workflow (e.g., director, cinematographer, animator, etc.) conventionally has its own standardized formatting for describing inputs (e.g., the product each job receives and needs to work on) and communicating outputs (intermediate products to show others). These inputs and outputs can include storyboards, animatics (rough sketched animations), exposure sheets (details on animation cells at the frame level), previsualizations (camera movement simulations), needle-drops (temporary musical scores), and the like. Using a script writing markup language to indicate animation events provides a more generalized format for communicating information across the different jobs in the animation production workflow, eliminating many unnecessary formatting conversions. As such, the efficiency of the animation production workflow is improved over prior techniques.

In some embodiments, a script writing markup language such as FOUNTAIN® may be extended to support animation events by embedding the animation events within comments. Generally, a script writing markup language may include a defined structure for character dialogue and scene changes, and may be configured to automatically apply a standardized format (e.g., capitalization, spacing, indentation, highlighting, etc.). For example, dialog may be indicated by a centered and capitalized character name followed by lines of indented text representing the dialogue. A scene change may be indicated in all capitals, unindented, and of the form: "EXT. WRITERS STORE—DAY" indicating an external (outdoor) scene at the writer's store during the day. Other animation events may be identified in comments. For example, FOUNTAIN parsers treats double-bracketing syntax as a comment, so double-bracketing syntax can be used to identify animation events in embodiments which extend FOUNTAIN.

In some embodiments, a three-part syntax may be used to identify animation events. In one example format, the syntax "type:character-action" can be used (e.g., [[type:character-action]]), where type indicates the kind of event to trigger (e.g., "motion" for animation, "camera" for a camera change, and "sound" for sound effects), and character and action specify arguments to the trigger. For example, "[[motion:Wilk-roar]]" can indicate that the Wilk character should perform the roar animation (which may be predefined and/or stored in an accessible library). In some embodiments, one or more arguments can be used to indicate a start time, a stop time, a duration, and/or a delay for an animation event. This syntax is merely meant as an example, and any other suitable syntax may be implemented.

In some embodiments, an existing script may simply be uploaded or otherwise accessed using script drafting interface 134. Further, script drafting interface 134 may include a raw text editor that facilitates drafting the script. Additionally or alternatively, script drafting interface 134 may have more advanced functionality to assist with drafting a script, for example, to assist with identifying and selecting available animation events. For example, in some embodiments, script drafting interface 134 may include a programming interface configured to automatically generate the appropriate animation event syntax. For example, script drafting interface 134 may accept an input selecting or otherwise identifying a character (e.g., by typing a character name, selecting a character from a drop down menu or panel of characters, etc.). The programming interface can access a list of animation events (e.g., motions/actions, camera effects, sound effects, scene transitions, etc.) available to that character. For example, the programming interface may have access to a library of characters and available animation events. A description or preview of one or more animation events can be presented, and an animation event can be selected in any suitable manner (a designated button press, a mouse click on a designated portion of the interface, etc.). The programming interface may be configured to automatically generate the syntax to specify the selected animation event. In some embodiments, the programming interface may include a compiler to check for syntax errors. As such, a programming interface can be used to draft a script with available animation events.

Script parser 102 (explained in more detail below) parses a script to identify dialog and corresponding animation events from the script, and the dialog and corresponding animation events are encoded into nodes of a story model (e.g., story model 110). Story model 110 represents the sequence of dialog and corresponding animation events that make up a script using nodes that reflect the temporal relationships among the animation events. Nodes can be attached to a specific word in the script such that a performance can be aligned with the script and used to trigger animation events corresponding to active nodes. In some embodiments, the story model is structured as a directed acyclic graph (DAG) that reflects temporal relationships between nodes with directed edges. For example, among other types, nodes can be generated for dialog, motion, camera effects, sound effects, scene transitions, scene changes, changes to lighting, and the like. Directed edges can represent temporal relationships between animation events. For example, animation events to be triggered by a corresponding performance may be associated with a node, while animation events to be triggered after a corresponding performance may be associated with an edge. In some embodiments, a start time, a stop time, a duration, and/or a delay can be associated with an animation event, for example, using an associated parameter, property, flag, etc. As explained below, each node may have a configurable state (e.g., play vs. record).

Story model 110 can support scripts where animation events overlap. For example, as a first character talks, he might gesture with his hands or pace back and forth. At the same time, other characters in the scene may react by changing their facial expressions. Story model 110 can represent these overlapping animation events with nodes that share a common parent node, indicating that corresponding (i.e., parallel) animation events should occur after the animation event represented by the parent node. In this regard, the structure of story model 110 can resemble a fish-bone, where a chain of parent nodes (e.g., speech nodes) form a central spine with other nodes (e.g., motion nodes, sound-effect nodes, scene nodes, and the like) branching off (see, for example, FIGS. 2*b*, and 3*a*-3*d*). As such, any number of node configurations is possible. By way of nonlimiting example, some speech nodes can have one or more associated motion nodes (e.g., lip sync, facial expression, etc.), while other speech nodes may not have an associated motion node (e.g., narrator speech). Similarly, a motion node may overlap with several speech nodes.

In some embodiments, story model 110 is structured as a DAG. As explained in more detail below, story model 110 can be used to generate a timeline representation, and a DAG facilitates efficient communication back and forth between story model 110 and the timeline. However, other structures or variations are possible. For example, a repetitive animation event can be represented as a single node, as opposed to a cycle. Conditional animation events can be implemented, for example, by configuring a child node to trigger off multiple inputs instead of off a single parent. These and other variations may be implemented within the present disclosure.

Story model 110 may support nodes for various types of animation events, such as dialog (speech nodes), character motion or animation (motion nodes), non-speech audio (sound effect nodes), transitions to pre-defined camera angles/positions (camera nodes), scene changes (scene nodes), improvisation (improvisation nodes), and the like.

Speech nodes represent one or more lines in a script, and may be associated with a specific character or a narrator. Audio for a particular speech node can be performed (e.g., speech 122) and associated with the node, or synthesized (text-to-speech synthesis) and associated with the node. Any suitable text-to-speech synthesis technique may be implemented, such as GOOGLE®'s Text-To-Speech API, a forced-alignment speech recognizer that performs an alignment using an audio signal, or otherwise.

Motion nodes represent an animation of a character. The animation itself may be performed (e.g., motion performance 124) or generated from a pre-defined library of motions. Any suitable technique may be implemented to generate motion. For example, ADOBE® Character Animator can be used to generate motion by generating an automatic lip sync from a voice performance, generating head motion and expression changes from a facial performance, and generating triggerable, pre-authored animation cycles for a given character. Any or all speech nodes may have an associated motion node (e.g., lip sync) or may not have an associated motion node (e.g., narrator speech), and a motion node may overlap with multiple speech nodes.

Sound-effect nodes represent non-speech audio events (e.g., the sound of rain or thunder) that can enhance the overall animation experience. Sound-effect nodes may trigger an associated pre-recorded audio file. Scene nodes represent scene changes in a script. These nodes can trigger changes to the "set" (e.g., background artwork) and can indicate when characters should be present in a given scene. Camera nodes represent transitions to pre-defined camera angles/positions, and can indicate any type of camera movement such as zoom, pan, tilt, dolly, truck, pedestal, rack focus, and the like. Improvisation nodes represent a portion of the script where a performer can improvise. As explained in more detail below, an improvisation node can be used to indicate to story controller 104 that a particular performance (e.g., speech 122 and/or motion performance 124) should be recorded and associated with the node, despite a lack of alignment with the script. For example, a script markup for improvisation can indicate to allow fuzzy alignment, to allow more fuzzy alignment, to allow misalignment, and the like. These, and other types of nodes may be implemented within the present disclosure.

To generate story model 110, script parser 102 parses the script to identify the animation events, and encodes the animation events into nodes of story model 110. More specifically, script parser 102 may construct a linear sequence of speech nodes from lines in the script. In some embodiments, within each parsed line, a speech node may be generated for each contiguous sequence of words between consecutive animation markups. Script parser 102 may connect adjacent nodes with directed edges. For each speech node, motion nodes may be automatically generated, depending on the capabilities of a corresponding character. For example, many characters support lip sync features, some are rigged to support head/facial animation, and the narrator may not support any motion. If a character supports one or more of these animations, script parser 102 may automatically generate corresponding motion nodes. For each animation markup contained within the script, script parser 102 generates a corresponding node, for example, with a directed edge originating from a preceding node (e.g., the preceding speech node). In the embodiment illustrated in FIG. 1, script parser 102 generates nodes 114A through 114J to encode story model 110.

Figure 2A:
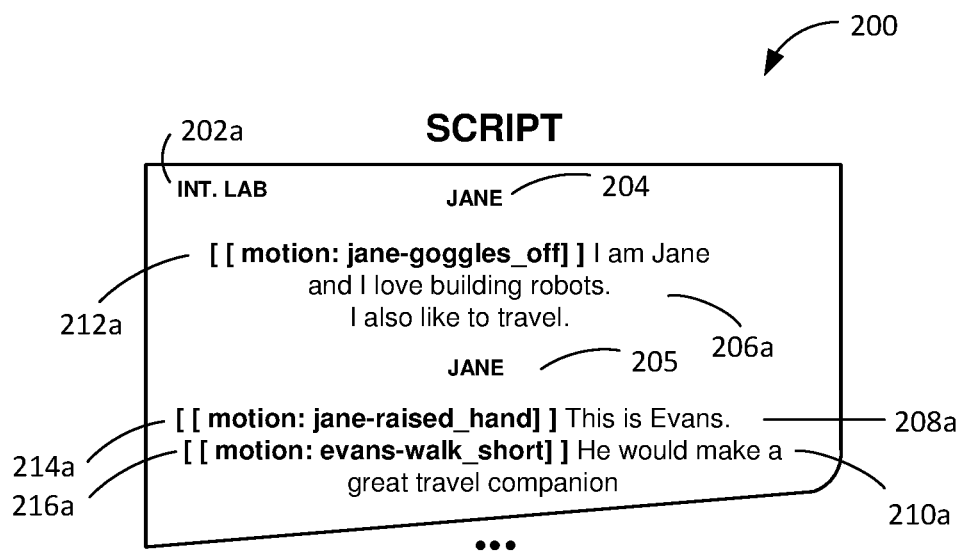
FIG. 2a illustrates an example script with dialog and markup specifying animation events, in accordance with embodiments of the present invention.
Figure 2B:
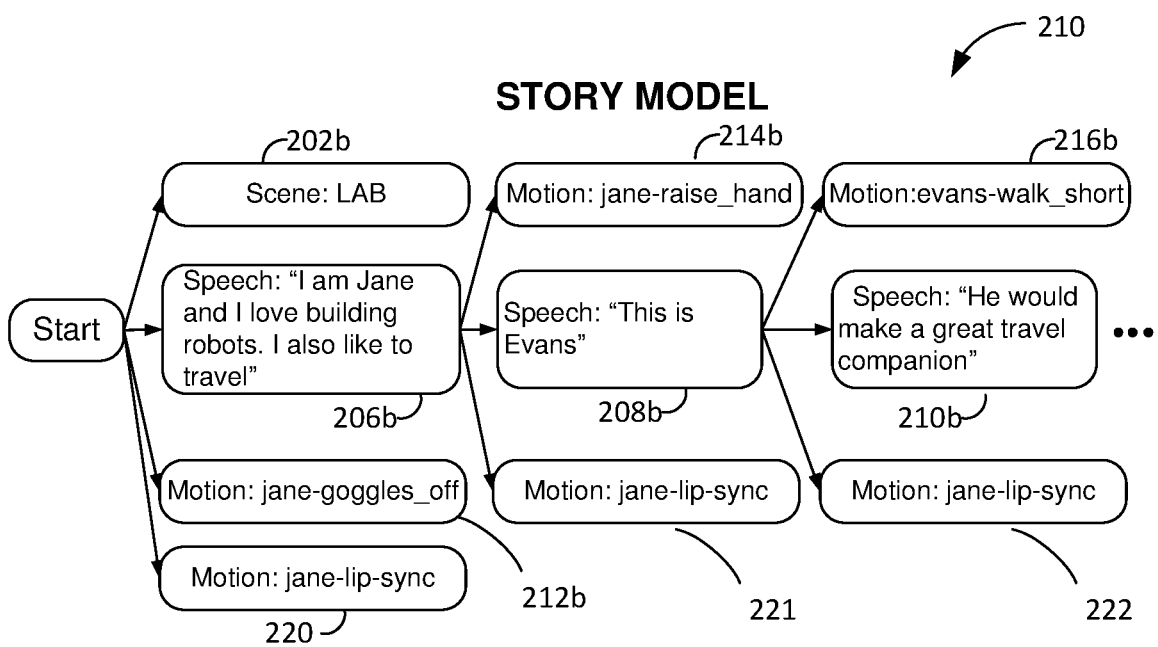
FIG. 2b illustrates an example story model, in accordance with embodiments of the present invention.

FIGS. 2*a* and 2*b* illustrate an example script 200 indicating various animation events, and a corresponding example story model 210. In FIG. 2*a*, script 200 includes scene information 202, character headings 204 and 205, dialog 206*a*, 208*a* and 210*a*, and animation markup 212*a*, 214*a* and 216*a*. Script 200 can be parsed (e.g., using script parser 102 of FIG. 1) to identify animation events corresponding to scene information 202, dialog 206*a*, 208*a* and 210*a*, and animation markup 212*a*, 214*a* and 216*a*, and the identified animation events can be used to encode story model 210. More specifically, character headings 204 and 205 are identified and used to indicate a speaking character, and dialog 206*a*, 208*a* and 210*a* are identified and used to generate corresponding speech nodes 206*b*, 208*b* and 210*b* for the identified character. Scene information 202 is identified and used to generate scene node 202*b*. Animation markup 212*a*, 214*a* and 216*a* are identified and used to generate corresponding motion nodes 212*b*, 214*b* and 216*b*. In the embodiment illustrated in FIGS. 2*a* and 2*b*, motion nodes 220, 221 and 222 are automatically generated to trigger lip sync animations for corresponding speech nodes 206*b*, 208*b* and 210*b*.

Story model 210 includes arrows connecting each node to a prior parent node. In some embodiments, each node connected to a common parent node (e.g., nodes 202*b*, 206*b*, 212*b* and 220) can be triggered simultaneously based on the parent node (e.g., based on the beginning or completion of a prior amination event corresponding to the parent node, at some designated time relative to the prior animation event, etc.). For example, starting playback of story model 210 can trigger animation events associated with each of nodes 202*b*, 206*b*, 212*b* and 220 to play back. In another example, Jane's line introducing robot Evans (speech node 208*b*) is a parent node for an animation of Evans walking into the scene (motion node 216*b*), which can be triggered by Jane's line, "This is Evans" (speech node 208*b*).

Returning now to FIG. 1, story controller 104 coordinates recording and playback of an animated movie based on real-time speech and motion performance input (e.g., speech 122 and motion performance 124). Generally, speech 122 can include spoken language, while motion performance 124 can include facial expression, appendage movement, torso movement, gesticulation, and the like. During playback, story controller 104 listens to input commands. During a recording, story controller 104 listens to dialog (e.g., by recording audio of speech 122) and listens for input commands (e.g., directorial interactions). Input commands can be detected through a command interface (e.g., speech 122, speech to text engine 116, motion performance 124, performance capture engine 118, command parser 108, text aligner 112, some other interface component, or some combination thereof). Although embodiments are described herein with respect to voice-based input commands, any variation or combination of types of commands may be implemented (e.g., input commands received through a physical interface such as a touch screen, mouse, joystick, controller and the like, input commands detected from an optical input such as a camera or IR sensor, input commands detected using a motion or orientation sensor such as an accelerometer or gyro, some combination thereof, etc.).

In some embodiments, story controller 104 distinguishes between voice-based input commands and vocal performances in speech 122 during a recording mode. For example, speech to text engine 116 can transcribe a voice-based input (e.g., speech 122) into text in real-time, while performance capture engine 118 maps motion performance 124 into a corresponding character animation in real-time. In some embodiments, a live camera may feed may be used to record facial performances, and a microphone can be used to record speech. Story controller 104 attempts to align the voice-based input (e.g., transcribed speech) with the script. If a misalignment is detected (e.g., indicating the animator may have said something that is not in the script), the voice-based input may be analyzed to identify a voice-based command (e.g., "stop recording"). As such, story controller 104 can distinguish between a voice-based input command and a performance in order to control recording and playback.

In the embodiment illustrated in FIG. 1, story controller 104 includes command parser 108, text aligner 112, and playhead 130. Playhead 130 identifies a current active node(s) within story model 110. During recording or playback modes, playhead 130 advances through story model 110. During playback, playhead 130 can advance through story model 110 at a regular rate of speed. During recording, playhead 130 may advance from one set of parallel nodes to the next at a regular rate of speed, when transcribed speech indicates a prior speech node has been completed, or indicates a subsequent speech node has begun, or otherwise. In one example, playhead 130 can advance through the speech nodes in the story model as performer reads the script, and story controller 104 records the audio and associates the audio with a corresponding speech node. Further, an animation event associated with any active node identified by playhead 130 can be triggered. Timing for triggering and/or the associated animation event can depend on a parameter, property, flag, etc. associated with an associated node (e.g., start time, stop time, duration, delay, play vs. record state, etc.).

For example, whether an active node is recorded or simply played back can depend on the state of the node, and may be reflected by a corresponding parameter, property or flag. If a node is designated for recording, recording the node can replace an existing recording with a recording of a new performance, or save the performance as a new version. For each active speech node and motion node in a record state, story controller 104 and/or animation engine 106 converts a performance into recorded audio (for speech nodes) or a corresponding animation (for motion nodes). For scene nodes, sound-effect nodes, and motion nodes that trigger pre-authored animation cycles, recording may simply specify a time when a corresponding animation event should occur. On the other hand, if a node is designated for playback, a previous recording, automatically generated motion, or synthesized audio can be played back. If there is no previous content for the node, the content can be generated or otherwise synthesized by animation engine 106, for example, in real time. For each active node in the play state, each node plays its recorded content at a time indicated by story model 110. For unrecorded speech nodes, playback can involve animation engine 106 synthesizing the speech. Unrecorded motion nodes that require an explicit user performance can be skipped. When nodes finish playing or recording, story controller 104 moves playhead 130 to the next node.

When animation production system 128 enters a recording mode, received speech 122 is likely to be a vocal performance. As such, text aligner 112 can perform a text alignment between transcribed speech (from speech to text engine 116) and a script segment associated with the active speech node being recorded. Any technique for aligning transcribed speech with a script may be implemented. In some embodiments, text aligner 112 attempts to match one or more transcribed words to one or more words in the script. In one example, text aligner 112 attempts to individually match each transcribed word to the script in sequence. Fuzzy matching can be used in order to account for errors (e.g., in performance, in transcription, etc.). The fuzzy matching can utilize a configurable amount of tolerance, and may include a default value. Using fuzzy matching, text aligner 112 can ensure animation production system 128 will work properly even if the voice recognition system (e.g., speech to text engine 116) makes mistakes, and can support ad-libbing by a performer. In the latter case, improvisation occurring during a performance (whether triggered by an improvisation node, an improvisation command input, a detected improvisation, or otherwise) can be transcribed and used to automatically update the script and/or story model.

To give a performer real-time feedback during a performance, animation production system 128 can display and update a teleprompter interface (such as teleprompter interface 402 of FIG. 4) by highlighting, selecting, or otherwise indicating words that are successfully matched by text aligner 112. When text aligner 112 matches the last word(s) in a speech node, story controller 104 traverses story model 110 and automatically moves playhead 130 to the next set of nodes. If text aligner 112 detects a misalignment (e.g., outside the fuzzy matching tolerance), story controller 104 can stop recoding the performance and assign control to command parser 108.

As explained above, in some embodiments, animation production system 128 can support vocal and motion performance interactions, as well as non-dialog voice commands (e.g., remote directing). Any type of command can be implemented, including commands to start, pause, replay, re-perform, and end performance recordings. In this regard, command parser 108 can attempt to match transcribed speech with a set of pre-defined commands. A command template look-up may be used to define and associate a set of command phrases with corresponding intended functions (e.g., play, record, retake, layer, stop, etc.). The command phrases may contain place-holder tags and/or placeholder values for certain words that get tagged and/or replaced by command parser 108 during parsing. For example, a retake command template for a specific line may be: "Let's redo line ['line-number', 'four']." Here, "line-number" is the tag and "four" is the placeholder text. During a performance, a user might issue the command "let's redo line two." When parsed, "two" is tagged as the line-number, and can be used to execute the "retake" function (e.g., by navigating playhead 130 to the speech node corresponding to line two). As such, executing a command can involve not only recording and playback functions, but also navigating the script (and/or story model 110). Example navigation commands might include: "Go to where [character] says [dialog]," "Let's redo last line," "Let's redo line [line number]," "Let's layer [character] on line [line number]," "Play from beginning," and the like. Example recording mode commands might include: "Start recording," "Stop recording," "Let's record [character name]," "Cut," and the like.

In some embodiments, animation production system 128 can infer context for the command. For example, if a user issues the command "retake" or the command "let's try that again" when recording line two without specifying which line to retake, line two may be inferred. In this example, playhead 130 moves back to the start of line two, and all animation events associated with that node are set to record in order to re-record line two. As such, executing a command can involve controlling recording and playback, navigating the script (and/or story model 110), and/or setting a state or other parameter, property, flag, or the like associated with a node.

When the transcribed speech matches a pre-defined command, story controller 104 updates playhead 130, and the state of each node can be set to play or record, depending on the command. If transcribed speech does not match the script or a pre-defined command, an error message can be displayed to the performer.

During playback (which can but need not occur at the same time as recording), for each active node identified by playhead 130, animation engine 106 generates an animation movie by assembling recorded performances for each character, by generating and/or synthesizing animation events (e.g., based on speech 122 and/or motion performance 124) for unrecorded nodes, and/or by skipping unrecorded nodes that require an explicit performance. Animation engine 106 can automatically map a facial performance to head motion and expression changes, and can convert speech input into lip sync (i.e., mouth motions). In some embodiments, animation engine 106 can trigger pre-authored animation cycles for any character. Story controller 104 can inform animation engine 106 which animation events to trigger at which times, based on the position of playhead 130 and/or any parameters, properties, flags, or the like associated with the active nodes. Further, since the position of playhead 130 can be advanced based on the progress of a vocal performance through the script, animation engine 106 can trigger animation events based on the content of the vocal performance, rather than through low-level manual editing and post-processing steps, like in the past. Although techniques are described herein with respect to an animated movie, other types of multimedia can be supported. For example, a presenter delivering a presentation can use the present techniques to trigger animations while speaking. These and other variations are contemplated.

In some embodiments, animation engine 106 can assemble an animated movie and present the animated movie as a live animation preview, for example, during a performance or playback. The live preview can provide a performer with valuable feedback that can improve the resulting performance and reduce the number of takes needed to obtain a desired outcome.

Additionally and/or alternatively to assembling an animated movie, animation engine 106 can generate a traditional animation timeline from story model 110. More specifically, the animation timeline can include multiple tracks for different characters and segments that correspond to each recorded performance or generated/synthesized animation events. As such, story model 110 can be viewed as a script (e.g., in a teleprompter interface) or as an animation timeline. The animation timeline can be presented to facilitate editing to refine the animated movie. In some embodiments, edits to an animation timeline can be flowed back into story model 110 and/or the original script. For example, edits may trigger in the addition of new nodes or the deletion or deactivation of pre-existing nodes, for example, at the time of the edit, while "replaying" the story model, or some other time. By replaying the story model, an updated animated movie can be automatically re-rendered without the animation events corresponding to the deleted/deactivated nodes. As such, the script itself can be changed even after recording has started.

Additionally or alternatively to script changes resulting from edits in a corresponding animation timeline, script drafting interface 134 may be used to make edits to the script after recording has begun. If changes result in new nodes that require performance, the performer can record them. If a line or event is removed from the script, the corresponding node(s) can also be removed from the story model. By replaying the story model, the new animated movie can be re-rendered. Additionally or alternatively, improvisation occurring during a performance can be transcribed and used to automatically update a script and/or story model. When an improvisation occurs while recording, recording the performance and assembling an animated movie may happen automatically, so there may be no need to rerecord or to reassemble the animated movie.

With reference now to FIGS. 3*a* through 3*d*, example diagrams are shown illustrating different story model states corresponding to various animation commands. Each of the nodes depicted in FIGS. 3*a* through 3*d* can be set to record ("R") or play ("P") (or skip) based on a recording mode (e.g., a single character recording, a retake, a layering performance, etc.). As the playhead moves along the story model, for nodes that are set to record, a corresponding performance is captured. Nodes that are set to play (e.g., pre-recorded voice and motion performances, timed animations, sounds, scene changes, etc.) are "performed" by the animation production system. In each of FIGS. 3*a* through 3*d*, the center nodes represent speech nodes (e.g., nodes 308, 314, and 318 in FIG. 3*a*), nodes above them are motion nodes corresponding to lip sync (e.g., nodes 306, 312, and 316 in FIG. 3*a*), and nodes below them are motion nodes corresponding to head motion (e.g., node 310 in FIG. 3*a*). This selection is presented merely as an example. It should be understood that other nodes and other types of nodes (e.g., scene nodes, improvisation nodes, camera nodes, etc.) can additionally or alternatively be included in each of FIGS. 3*a* through 3*d*.

Figure 3A:
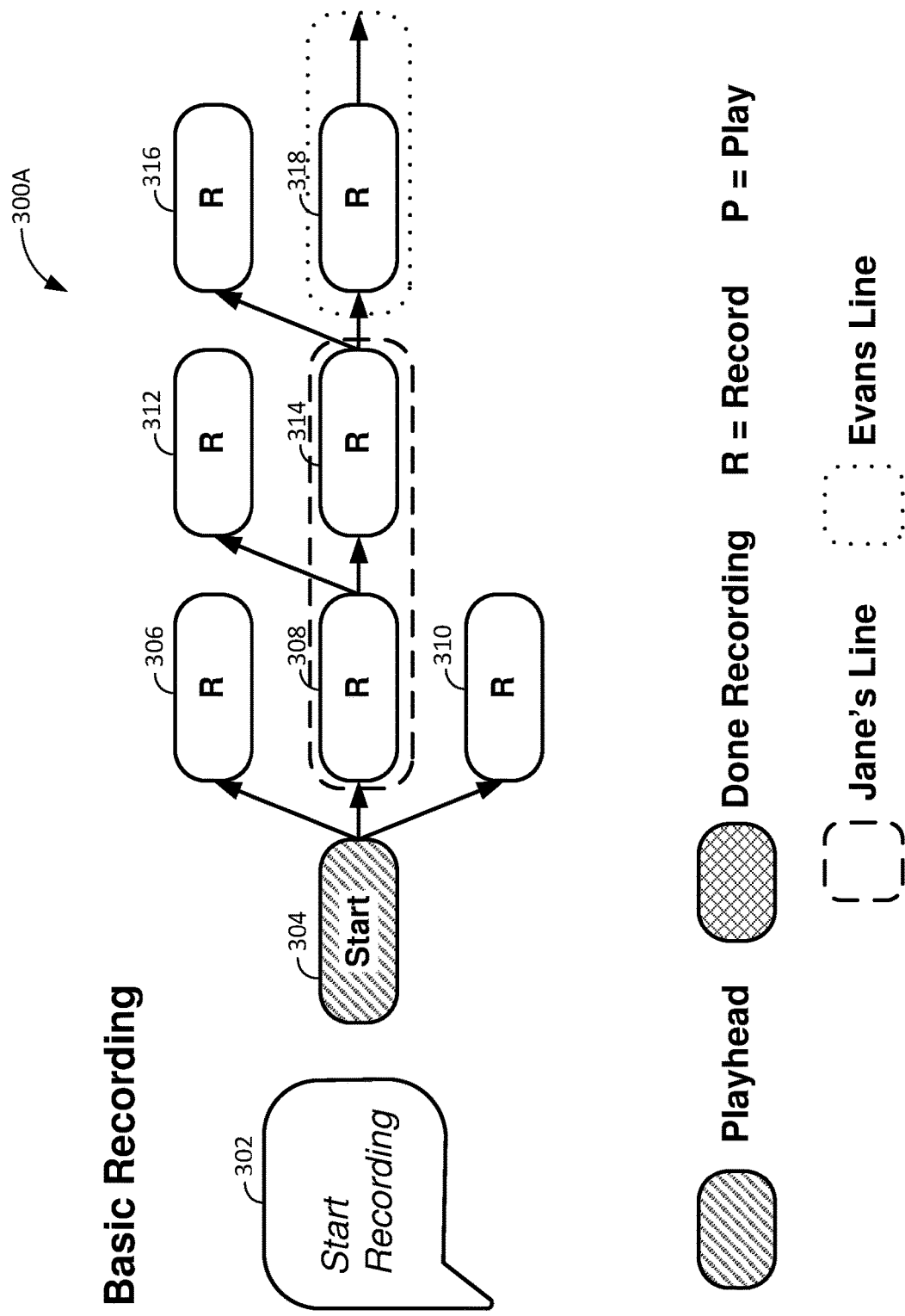
FIG. 3a is a diagram showing an example story model in a basic recording state, in accordance with embodiments of the present invention.

FIG. 3a illustrates story model 300A in a basic recording state. Story model 300A includes speech nodes 308, 314, and 318, lip sync motion nodes 306, 312, and 316, and head motion node 310. Playhead 304 is initially positioned at the starting position (e.g., the left most position) of story model 300A. Bubble 302 indicates a received input command, "Start Recording." In this scenario, the states for each of the nodes in story model 300A are set and/or were previously set to record (state R), for example, by default. Upon detecting the command, playhead 304 moves from node to node (e.g., from left to right) and records an associated performance. More specifically, Jane's lines are indicated by a dashed line (e.g., speech nodes 308 and 304), while Evans' lines are indicated by a dotted line (e.g., speech node 318). Each of the nodes in story model 300A is depicted with an arrow leading from a parent node, so columns of parallel nodes can be triggered from the same parent node. As playhead 304 moves, columns of parallel nodes are recorded at the same time. In one example embodiment, after Jane finishes performing the dialog corresponding to speech node 314, Evans can begin recording his dialog corresponding to speech node 318, and corresponding lip sync motion node 316 will trigger a lip sync to match Evans' vocal performance. In this regard, performances can be recorded and animation events can be triggered, regardless of which character is performing.

Figure 3B:
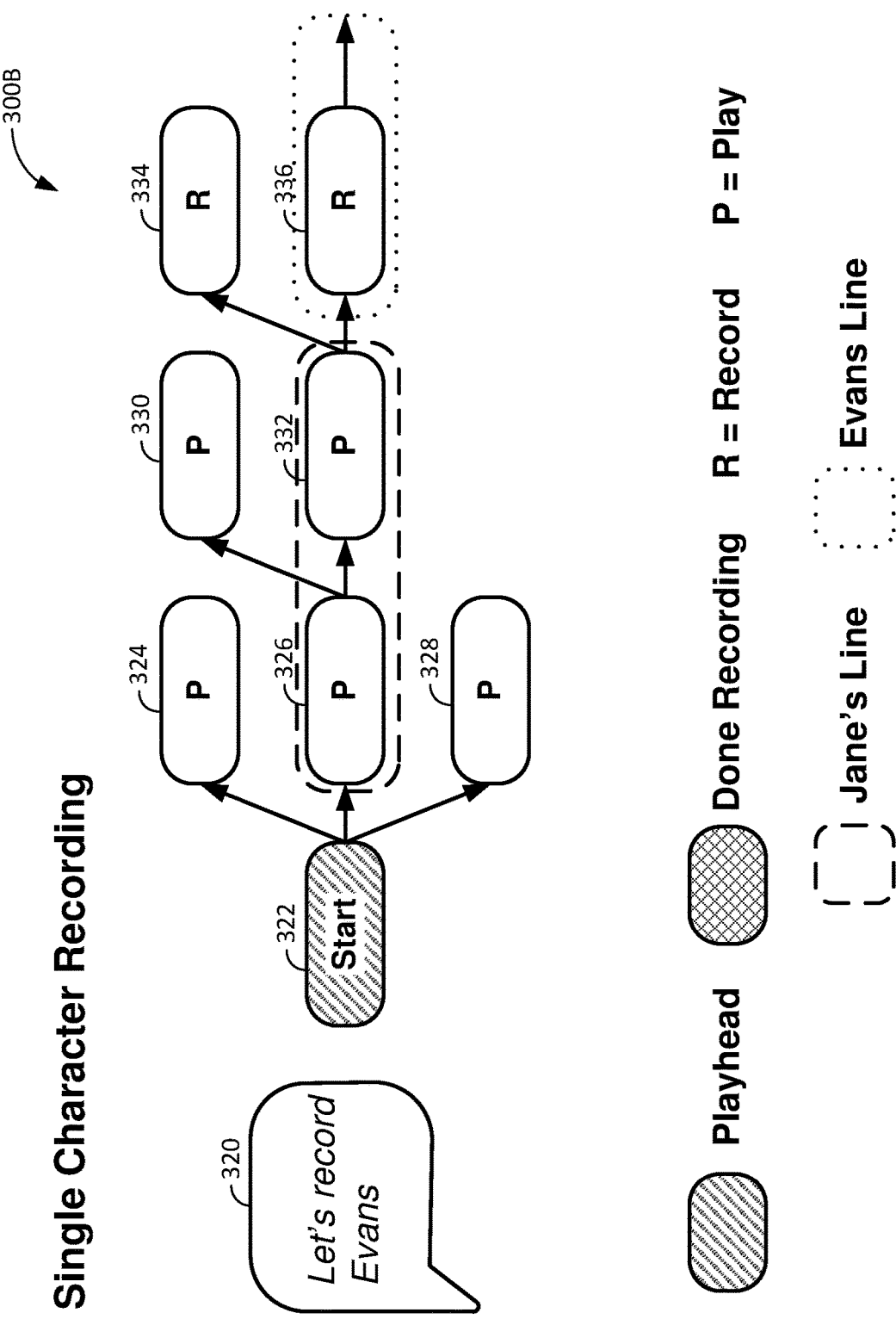
FIG. 3b is a diagram showing an example story model in a single character recording state, in accordance with embodiments of the present invention.

FIG. 3b illustrates story model 300B in a single character recording state. Story model 300B includes speech nodes 326, 332, and 336, lip sync motion nodes 324, 330, and 334, and head motion node 328. Playhead 322 is initially positioned at the starting position (e.g., the left most position) of story model 300B. Bubble 320 indicates a received input command, "Let's record Evans." Upon detecting the command, nodes corresponding to the Evans character are set to record (R), while the other nodes are set to play (P). More specifically, speech node 336 (Evans' dialog) and motion node 334 (lip sync for Evans) are set to record, while the other nodes (for Jane) are set to play. In this manner, story model 300B can be configured to record only a designated character (or characters) performance(s). As playhead 322 moves across the nodes, the nodes associated with character Evans are recorded, while the nodes associated with other characters are played (e.g., using previously recorded performances or generated/synthesized animation events).

Figure 3C:
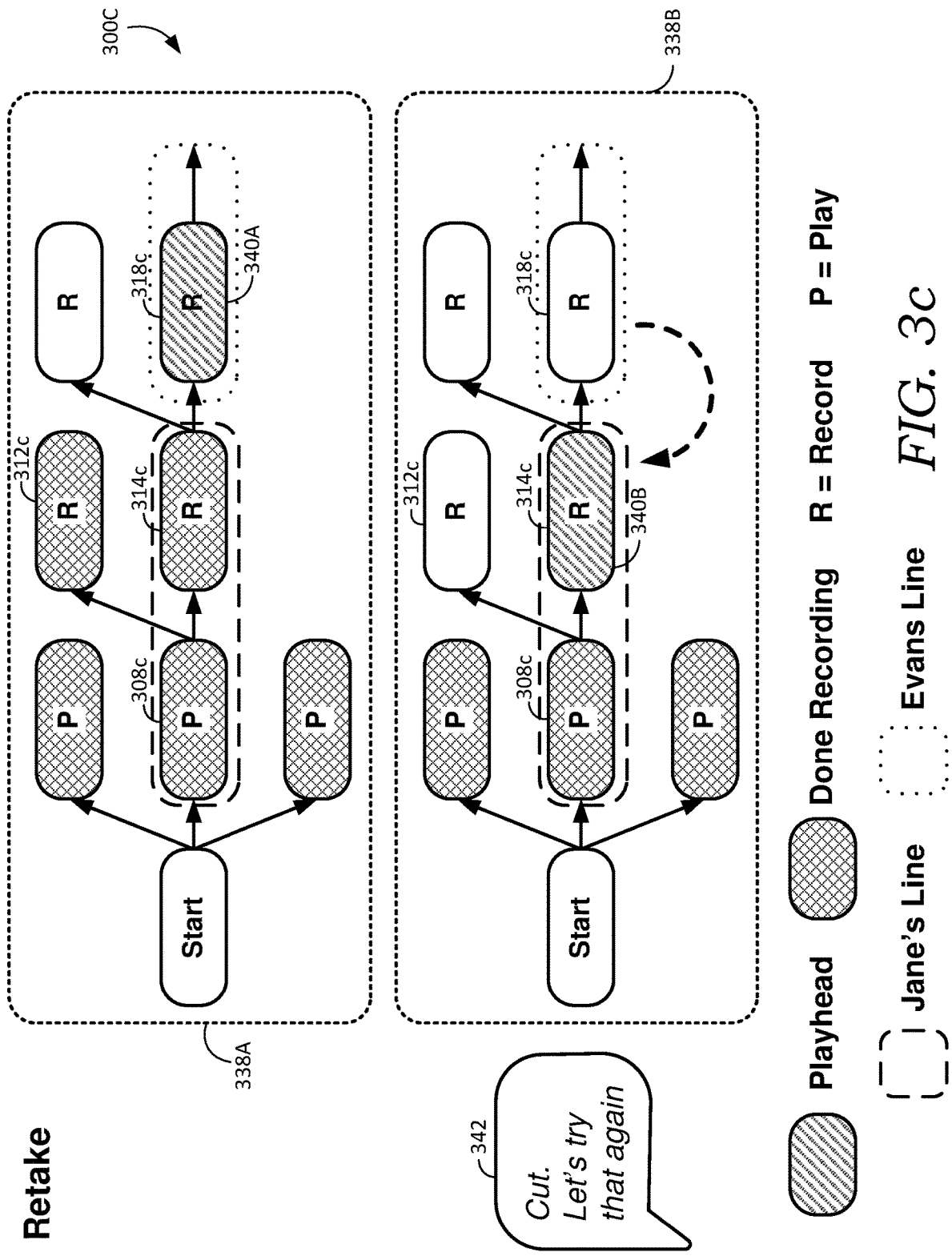
FIG. 3c is a diagram showing an example story model in a retake recording state, in accordance with embodiments of the present invention.

FIG. 3c illustrates story model 300C in a retake recording state. Story model 300C includes various nodes which may correspond with nodes depicted in FIGS. 3a. State 338A depicts story model 300C when recording stops, upon receiving a command, "Cut. Let's try that again," indicated by bubble 342, while recording a performance of node 318c. In FIG. 3c, those nodes which have been recorded are identified with a thatched pattern. More specifically, nodes 308c and 314c have been recorded. In state 338A, playhead 340A (also indicated by a striped pattern) is positioned at node 318c, the node that was being recorded when the command was received. Upon receiving the command, recording stops, playhead 340A is repositioned, and states for the nodes of story model 300C are updated to retake state 338B. In general, a "Cut" command can reposition the playhead back to a current line of dialog being spoken (e.g., node 318c) or a previous line (e.g., node 314c). In the example illustrated in FIG. 3c, in retake state 338B, playhead 340B has been repositioned from node 318c to node 314c (the previous line), and the recordings for nodes 312c and 314c were deleted. In some embodiments, instead of deleting the old recordings, they can be saved. Detecting a retake command (e.g., "Let's Try that again") can cause record to automatically begin again from the updated position of playhead 340B. Embodiments that save multiple takes can support commands to use the last take, use the first take, and the like.

Figure 3D:
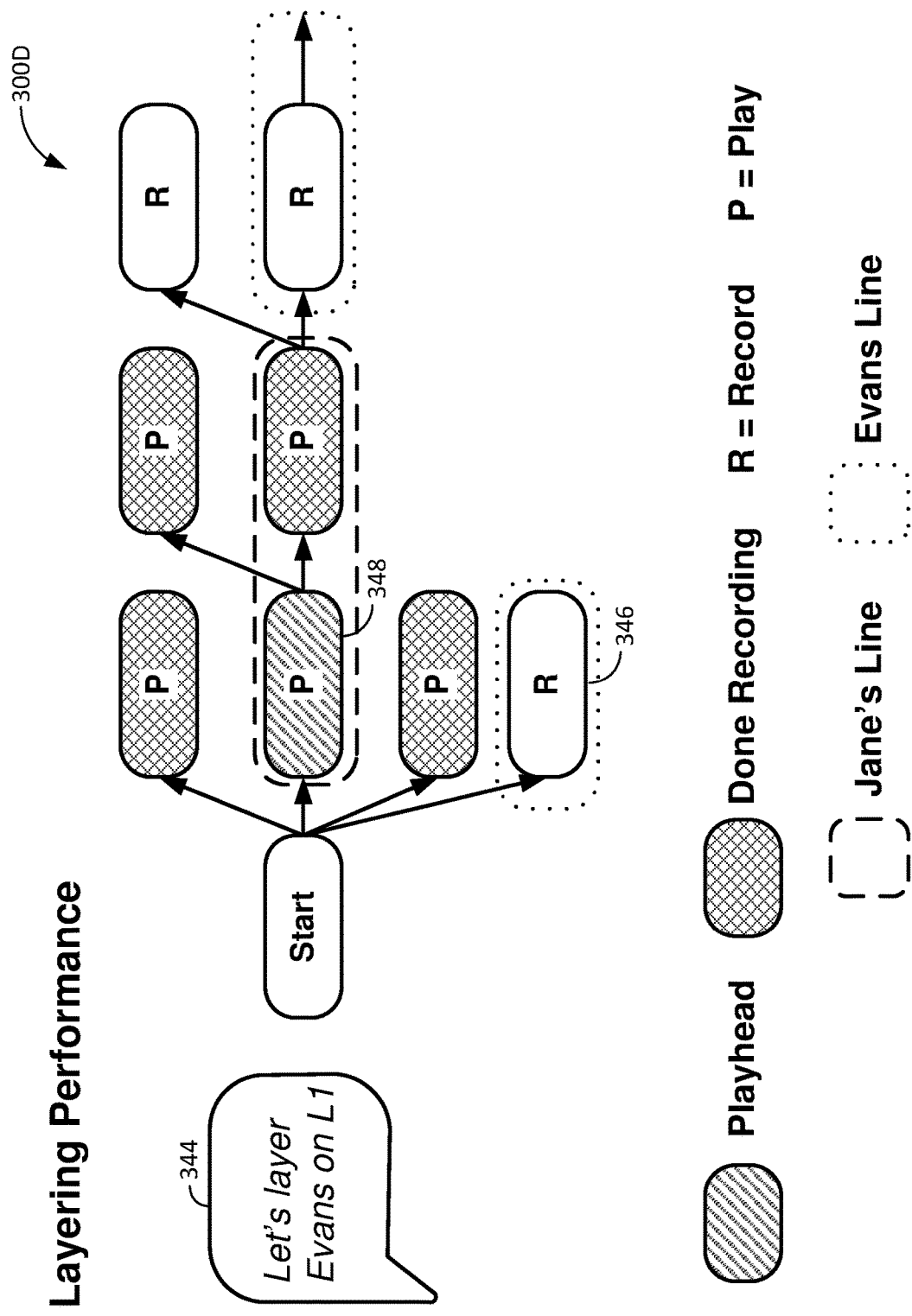
FIG. 3d a diagram showing an example story model in a layering recording state, in accordance with embodiments of the present invention.

FIG. 3d illustrates story model 300D in a layering recording state. Story model 300D includes various nodes which may correspond with nodes depicted in FIGS. 3c (e.g., state 338A). Instead of receiving a retake command as in FIG. 3c, a layering command is received in FIG. 3d. More specifically, bubble 344 indicates a received input command, "Let's layer Evans on L1." Upon detecting the command, story model 300D is configured to layer a performance of Evans on top of the existing performance for line 1 (L1) by setting the state to record for the nodes that should be recorded. For example, a performer may desire to record a response (whether scripted or unscripted) for Evans on top of something character Jane is saying. In this regard, character Jane's line (e.g., corresponding to node 348) is played while a performance for Evans is simultaneously recorded (e.g., corresponding to node 346) as a reaction to Jane's performance. As such, when layering performances, playback and recoding can occur simultaneously.

Figure 4:
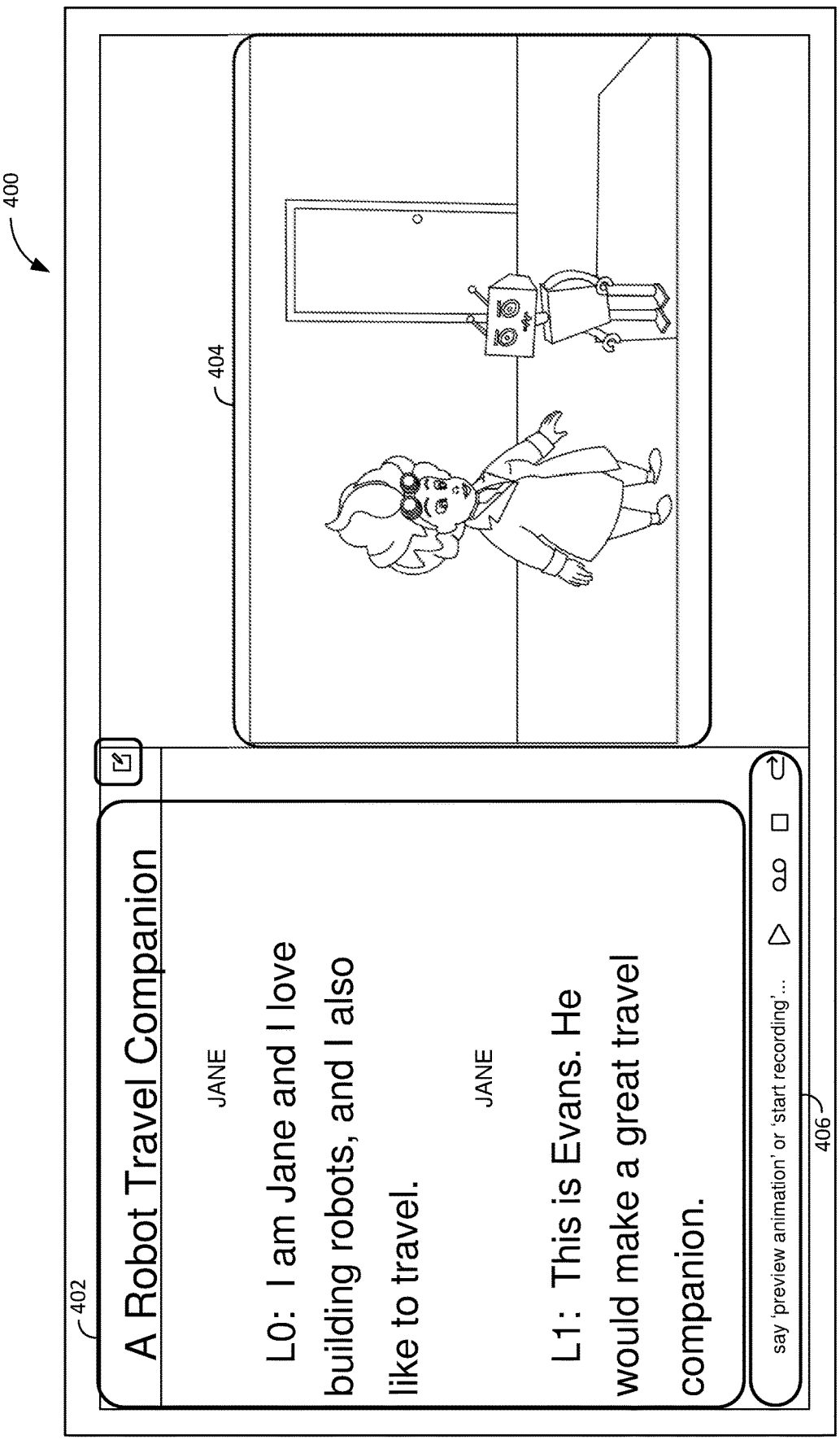
FIG. 4 illustrates an example graphical user interface, including a teleprompter interface and stage interface, in accordance with embodiments of the present invention.

Now turning to FIG. 4, an example graphical user interface 400, including a teleprompter interface and a stage interface for recording and producing performance-based animated movies, is shown. Graphical user interface 400 includes teleprompter interface 402, stage interface 404, and action bar 406. Teleprompter interface 402 presents a script on the user interface, optionally including corresponding lines numbers and/or character names. Stage interface 404 presents a live preview of an animated movie. During playback and/or recording, teleprompter interface 402 highlights, selects, or otherwise indicates detected words (e.g., transcribed words) in real-time, while the stage interface 404 simultaneously displays a live preview of a corresponding portion of an animated movie, which may be assembled in real-time. While teleprompter interface 402 and stage interface 404 are illustrated within graphical user interface 400 as side by side windows, it should be understood that any other configuration is possible.

Action bar 406 is configured to provide hints to the user for voice-based command interaction. For example, action bar 406 can display a hint (e.g., "say 'preview animation' or 'start recording'") to notify the user of various commands that, when recited, command the animation production system to execute a corresponding command (e.g., preview animation or start recording). Action bar 406 may be further configured to provide various editing buttons as an alternative to voice-based commands, for example, to facilitate command input from a physical interface for, among other activities, recording, stopping, retakes, and/or playing an animation movie. Any suitable layout and configuration for the graphical interface may be implemented.

Figure 5:
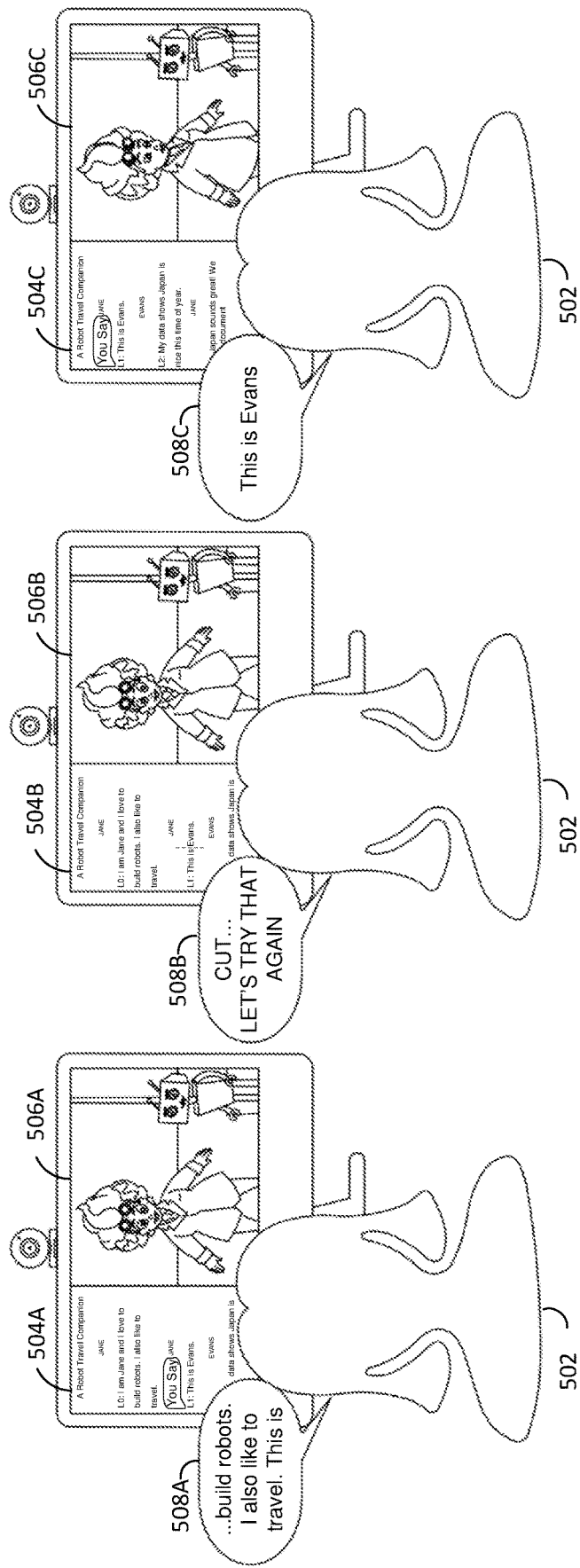
FIG. 5 illustrates example user interactions using voice-based commands to record and produce a performance-based animated movie, in accordance with embodiments of the present invention.

Now turning to FIG. 5, FIG. 5 depicts example user interactions using voice-based commands to record and produce a performance-based animated movie. FIG. 5 illustrates user 502, teleprompter interfaces 504A-C, stage interfaces 506A-C, and bubbles 508A-C. User 502 begins by reciting a portion of the script displayed by teleprompter interface 504A, more specifically, " . . . build robots. I also like to travel. This is" (bubble 508A). At the same time, stage interface 506A presents a live preview of a corresponding portion of an animated movie as user 502 performs the dialog in bubble 508A. Further, teleprompter interface 504A highlights the portions of the script being read by user 512, and automatically scrolls the script to the next line to be performed.

In this embodiment, user 502 wishes to retake the performance from the most recent line. At bubble 508B, user 502 recites the command "Cut . . . Let's try that again" to retake the performance. When the command is detected, teleprompter interface 504B stops highlighting words within the script, and stage interface 506B stops the live preview. Further, teleprompter interface 504C resets back to the beginning of the line that was being spoken, and stage interface 506C resets the live preview to a corresponding portion of the animated movie. In this regard, when a retake command is detected, the animated authoring system can automatically move back to the start of the most recently recorded line without requiring a user to specify which line to retake, and all the nodes in the story model associated with that line can be set to record for the re-take. At bubble 508C, user 502 begins recording the retake of L1, reading a corresponding portion of the script, and teleprompter interface 504C and stage interface 506C are automatically updated to reflect the progress of the performance.

Exemplary Flow Diagrams

Figure 6:
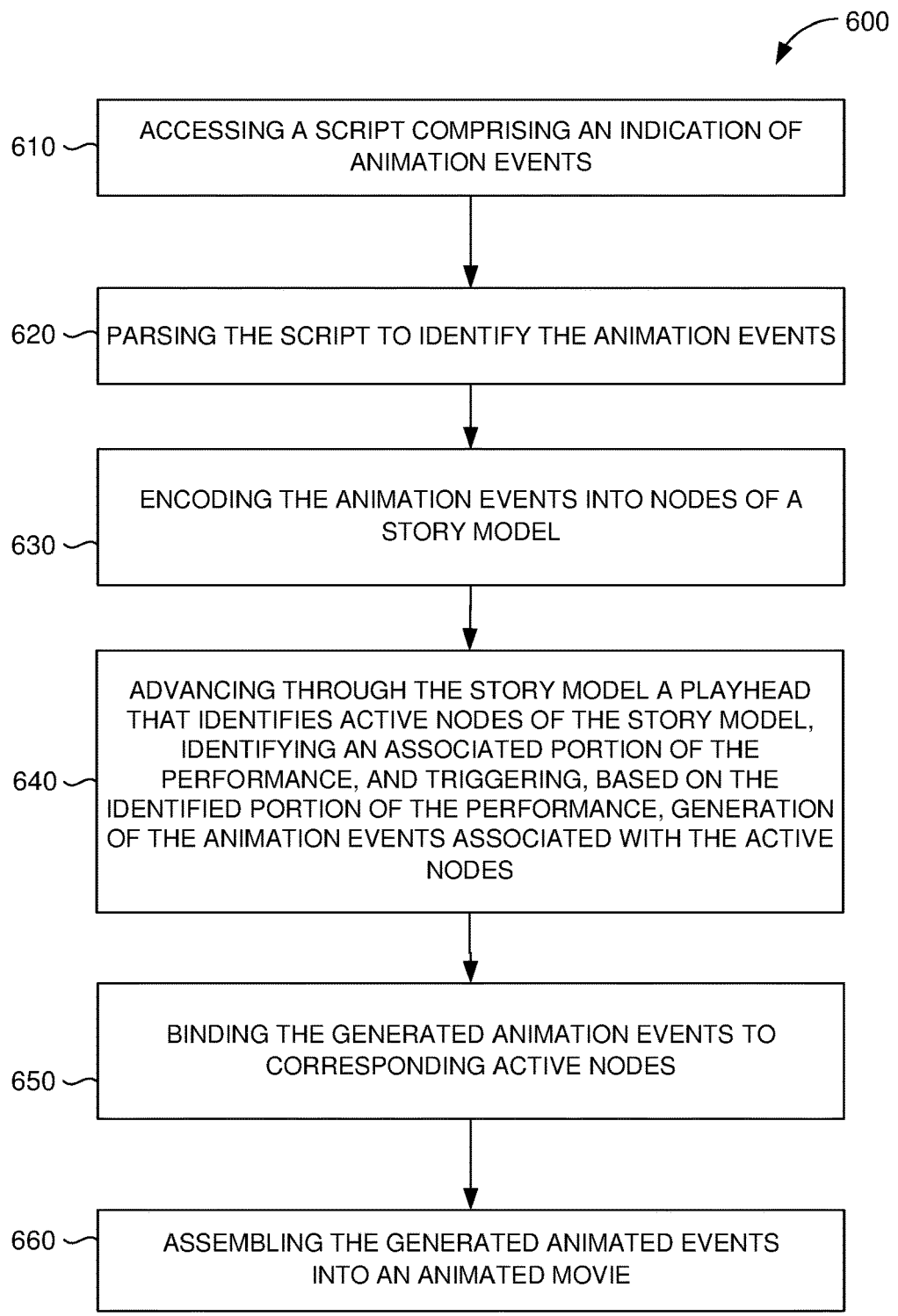
FIG. 6 is a flow diagram showing an example method for generating an animation, in accordance with embodiments of the present invention.
Figure 7:
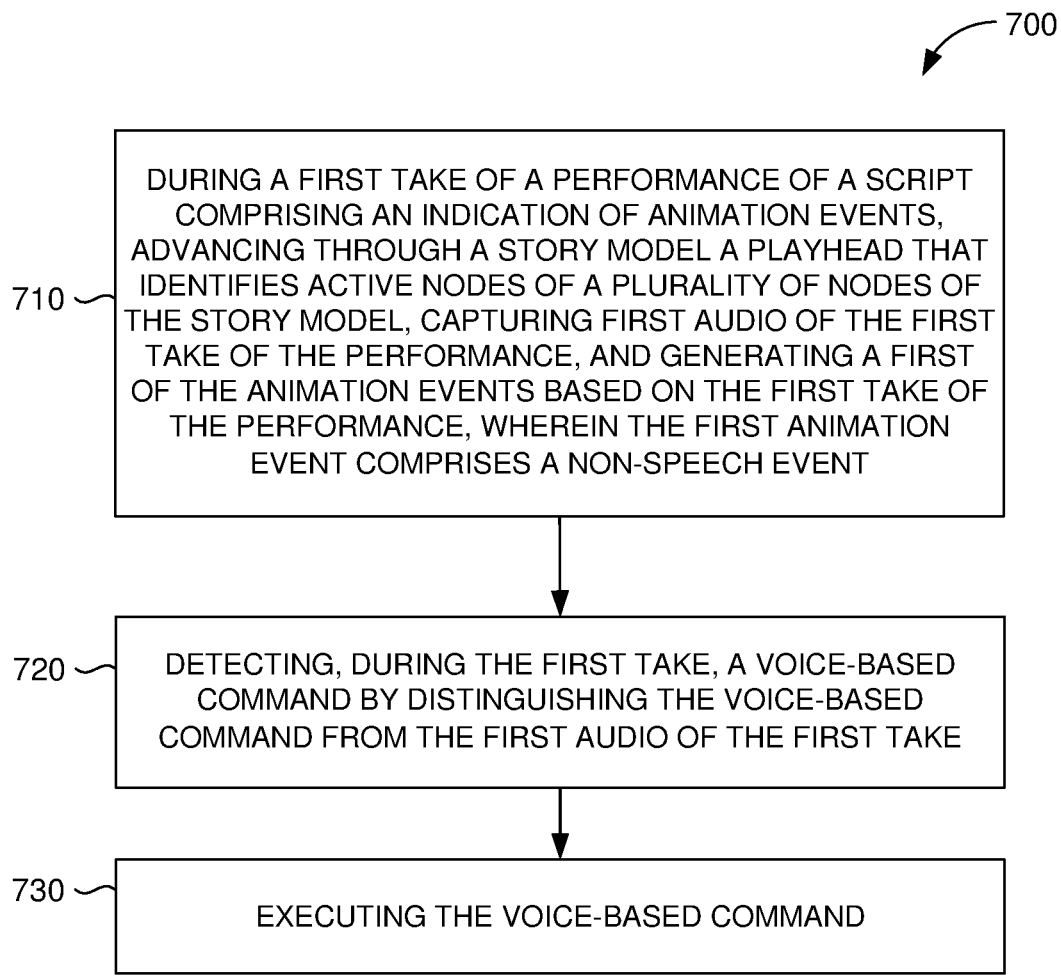
FIG. 7 is a flow diagram showing another example method for generating an animation, in accordance with embodiments of the present invention.

With reference now to FIGS. 6 and 7, flow diagrams are provided illustrating methods for generating an animation. Each block of the method 600 and any other methods described herein may comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning now to FIG. 6, FIG. 6 illustrates a method 600 for generating an animation, in accordance with embodiments described herein. Initially at block 610, a script is accessed. The script comprises an indication of animation events. At block 620, the script is parsed to identify the animation events. At block 630, the animation events are encoded into nodes of a story model. At block 640, a playhead that identifies active nodes of the story model is advanced, and an associated portion of the performance is identified. Generation of the animation events associated with the active nodes is triggered based on the identified portion of the performance. At block 650, the generated animation events are bound to corresponding active nodes. At block 660, the generated animation events are assembled into an animated movie.

Turning now to FIG. 7, FIG. 7 illustrates another method 700 for generating an animation, in accordance with embodiments described herein. Initially at block 710, during a first take of a performance of a script comprising an indication of animation events, a playhead that identifies active nodes of a plurality of nodes of a story model is advanced, first audio of the first take of the performance is captured, and a first of the animation events is generated based on the first take of the performance. The first animation event comprises a non-speech event. At block 720, a voice-based command is detected during the first take by distinguishing the voice-based command from the first audio of the first take. At block 730, the voice-based command is executed.

Exemplary Computing Environment

Figure 8:
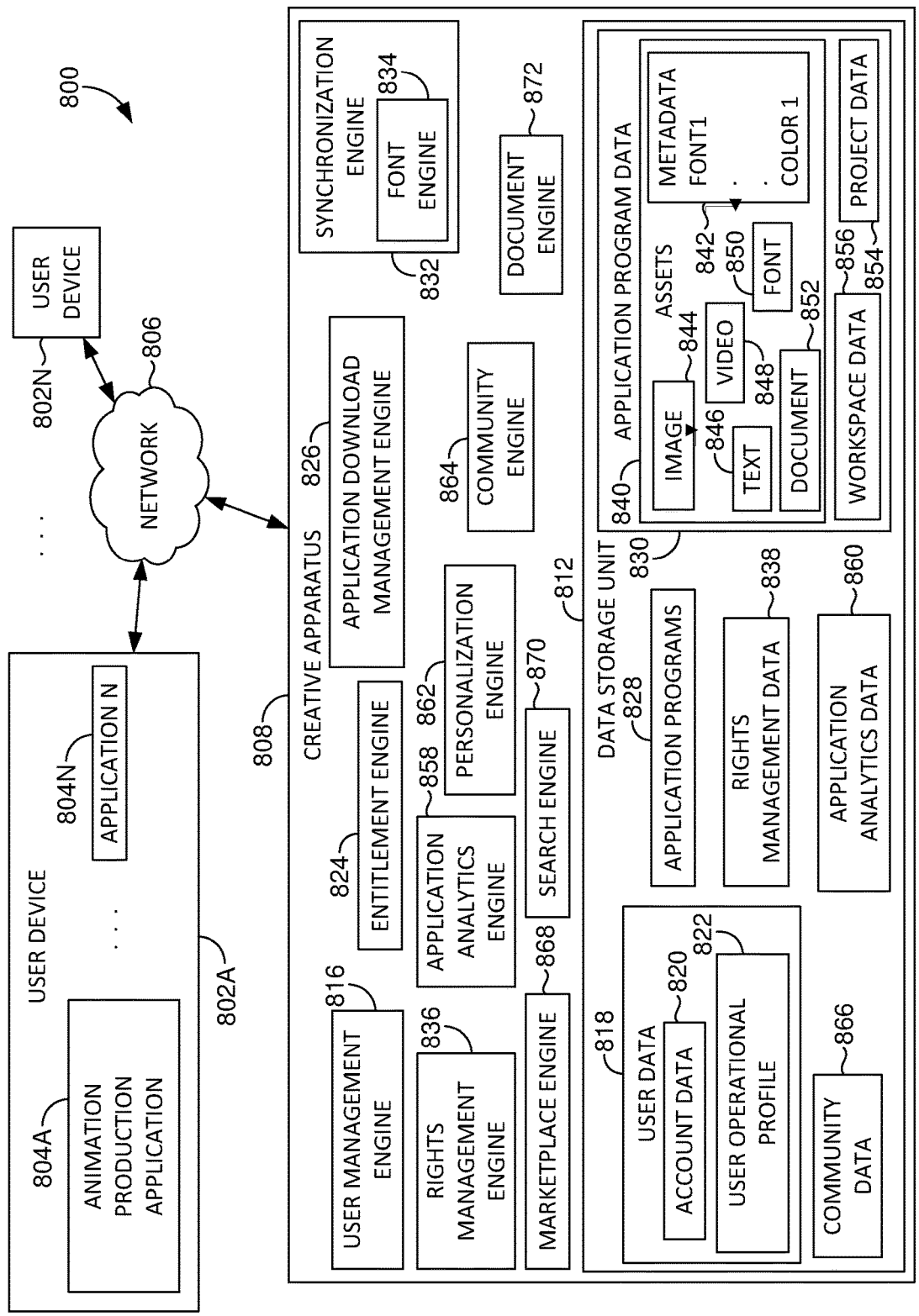
FIG. 8 is a block diagram of an exemplary computing environment in which embodiments of the invention may be employed.

FIG. 8 is a diagram of environment 800 in which one or more embodiments of the present disclosure can be practiced. Environment 800 includes one or more user devices, such as user devices 802A-802N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 808. It is to be appreciated that following description may generally refer to user device 802A as an example and any other user device can be used.

A user of the user device can utilize various products, applications, or services supported by creative apparatus 808 via network 806. User devices 802A-802N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 808.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 802A-802N can be connected to creative apparatus 808 via network 806. Examples of network 806 include, but are not limited to, internet, local area network (LAN), wireless area network, wired area network, wide area network, and the like.

Creative apparatus 808 includes one or more engines for providing one or more digital experiences to the user. Creative apparatus 808 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 808 also includes data storage unit 812. Data storage unit 812 can be implemented as one or more databases or one or more data servers. Data storage unit 812 includes data that is used by the engines of creative apparatus 808.

A user of user device 802A visits a webpage or an application store to explore applications supported by creative apparatus 808. Creative apparatus 808 provides the applications as a software as a service (SaaS), or as a standalone application that can be installed on user device 802A, or as a combination. The user can create an account with creative apparatus 808 by providing user details and also by creating login details. Alternatively, creative apparatus 808 can automatically create login details for the user in response to receipt of the user details. In some embodiments, the user is also prompted to install an application manager. The application manager enables the user to manage installation of various applications supported by creative apparatus 808 and also to manage other functionalities, such as updates, subscription account and the like, associated with the applications. User details are received by user management engine 816 and stored as user data 818 in data storage unit 812. In some embodiments, user data 818 further includes account data 820 under which the user details are stored.

The user can either opt for a trial account or can make payment based on type of account or subscription chosen by the user. Alternatively, the payment can be based on product or number of products chosen by the user. Based on payment details of the user, user operational profile 822 is generated by entitlement engine 824. User operational profile 822 is stored in data storage unit 812 and indicates entitlement of the user to various products or services. User operational profile 822 also indicates type of user, i.e. free, trial, student, discounted, or paid.

In some embodiment, user management engine 816 and entitlement engine 824 can be one single engine performing the functionalities of both the engines.

The user can then install various applications supported by creative apparatus 808 via an application download management engine 826. Application installers or application programs 828 present in data storage unit 812 are fetched by application download management engine 826 and made available to the user directly or via the application manager. In one embodiment, an indication of all application programs 828 are fetched and provided to the user via an interface of the application manager. In another embodiment, an indication of application programs 828 for which the user is eligible based on user's operational profile are displayed to the user. The user then selects application programs 828 or the applications that the user wants to download. Application programs 828 are then downloaded on user device 802A by the application manager via the application download management engine 826. Corresponding data regarding the download is also updated in user operational profile 822. Application program 828 is an example of the digital tool. Application download management engine 826 also manages the process of providing updates to user device 802A.

Upon download, installation and launching of an application program, in one embodiment, the user is asked to provide the login details. A check is again made by user management engine 816 and entitlement engine 824 to ensure that the user is entitled to use the application program. In another embodiment, direct access is provided to the application program as the user is already logged into the application manager.

The user uses one or more application programs 804A-804N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 830 in data storage unit 812 by synchronization engine 832. Alternatively or additionally, such data can be stored at the user device, such as user device 802A.

Application program data 830 includes one or more assets 840. Assets 840 can be a shared asset which the user wants to share with other users or which the user wants to offer on a marketplace. Assets 840 can also be shared across multiple application programs 828. Each asset includes metadata 842. Examples of metadata 842 include, but are not limited to, font, color, size, shape, coordinate, a combination of any of these, and the like. In addition, in one embodiment, each asset also includes a file. Examples of the file include, but are not limited to, image 844, text 846, video 848, font 850, document 852, a combination of any of these, and the like. In another embodiment, an asset only includes metadata 842.

Application program data 830 also include project data 854 and workspace data 856. In one embodiment, project data 854 includes assets 840. In another embodiment, assets 840 are standalone assets. Similarly, workspace data 856 can be part of project data 854 in one embodiment while it may be standalone data in other embodiment.

A user can operate one or more user device to access data. In this regard, application program data 830 is accessible by a user from any device, including a device which was not used to create assets 840. This is achieved by synchronization engine 832 that stores application program data 830 in data storage unit 812 and enables application program data 830 to be available for access by the user or other users via any device. Before accessing application program data 830 by the user from any other device or by any other user, the user or the other user may need to provide login details for authentication if not already logged in. In some cases, if the user or the other user are logged in, then a newly created asset or updates to application program data 830 are provided in real time. Rights management engine 836 is also called to determine whether the newly created asset or the updates can be provided to the other user or not. Workspace data 856 enables synchronization engine 832 to provide a same workspace configuration to the user on any other device or to the other user based on rights management data 838.

In various embodiments, various types of synchronization can be achieved. For example, the user can pick a font or a color from user device 802A using a first application program and can use the font or the color in a second application program on any other device. If the user shares the font or the color with other users, then the other users can also use the font or the color. Such synchronization generally happens in real time. Similarly, synchronization of any type of application program data 830 can be performed.

In some embodiments, user interaction with applications 804 is tracked by application analytics engine 858 and stored as application analytics data 860. Application analytics data 860 includes, for example, usage of a tool, usage of a feature, usage of a workflow, usage of assets 840, and the like. Application analytics data 860 can include the usage data on a per user basis and can also include the usage data on a per tool basis or per feature basis or per workflow basis or any other basis. Application analytics engine 858 embeds a piece of code in applications 804 that enables the application to collect the usage data and send it to application analytics engine 858. Application analytics engine 858 stores the usage data as application analytics data 560 and processes application analytics data 860 to draw meaningful output. For example, application analytics engine 858 can draw an output that the user uses "Tool 4" a maximum number of times. The output of application analytics engine 858 is used by personalization engine 862 to personalize a tool menu for the user to show "Tool 4" on top. Other types of personalization can also be performed based on application analytics data 860. In addition, personalization engine 862 can also use workspace data 856 or user data 818 including user preferences to personalize one or more application programs 828 for the user.

In some embodiments, application analytics data 860 includes data indicating status of a project of the user. For example, if the user was preparing an article in a digital publishing application and what was left was publishing the prepared article at the time the user quit the digital publishing application, then application analytics engine 858 tracks the state. Now when the user next opens the digital publishing application on another device, then the user is indicated and the state and options are provided to the user for publishing using the digital publishing application or any other application. In addition, while preparing the article, a recommendation can also be made by synchronization engine 832 to incorporate some of other assets saved by the user and relevant for the article. Such a recommendation can be generated using one or more engines, as described herein.

Creative apparatus 808 also includes community engine 864 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 840. Community engine 864 stores any data corresponding to the community, such as work shared on the community and comments or likes received for the work as community data 866. Community data 866 also includes notification data and is used for notifying other users by the community engine in case of any activity related to the work or new work being shared. Community engine 864 works in conjunction with synchronization engine 832 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 864 and synchronization engine 832. In collaborative workflows, a plurality of users is assigned different tasks related to the work.

Creative apparatus 808 also includes marketplace engine 868 for providing marketplace to one or more users. Marketplace engine 868 enables the user to offer an asset for selling or using. Marketplace engine 868 has access to assets 840 that the user wants to offer on the marketplace. Creative apparatus 808 also includes search engine 870 to enable searching of assets 840 in the marketplace. Search engine 870 is also a part of one or more application programs 828 to enable the user to perform search for assets 840 or any other type of application program data 830. Search engine 870 can perform a search for an asset using metadata 842 or the file.

Creative apparatus 808 also includes document engine 872 for providing various document related workflows, including electronic or digital signature workflows, to the user. Document engine 872 can store documents as assets 840 in data storage unit 812 or can maintain a separate document repository (not shown in FIG. 8).

In accordance with embodiments of the present invention, application programs 828 include animation production application 804A that facilitates recording and producing of performance-based animated movies. In these embodiments, animation production application 804A is provided to user device 802A (e.g., as application 804N) such that animation production application 804A operates via the user device. In another embodiment, a tool is provided as an add-on or plug-in to an application such as an animation production application. These configurations are merely exemplary, and other variations for providing storyboarding software functionality are contemplated within the present disclosure.

It is to be appreciated that the engines and working of the engines are described as examples herein, and the engines can be used for performing any step in providing digital experience to the user.

Exemplary Operating Environment

Figure 9:
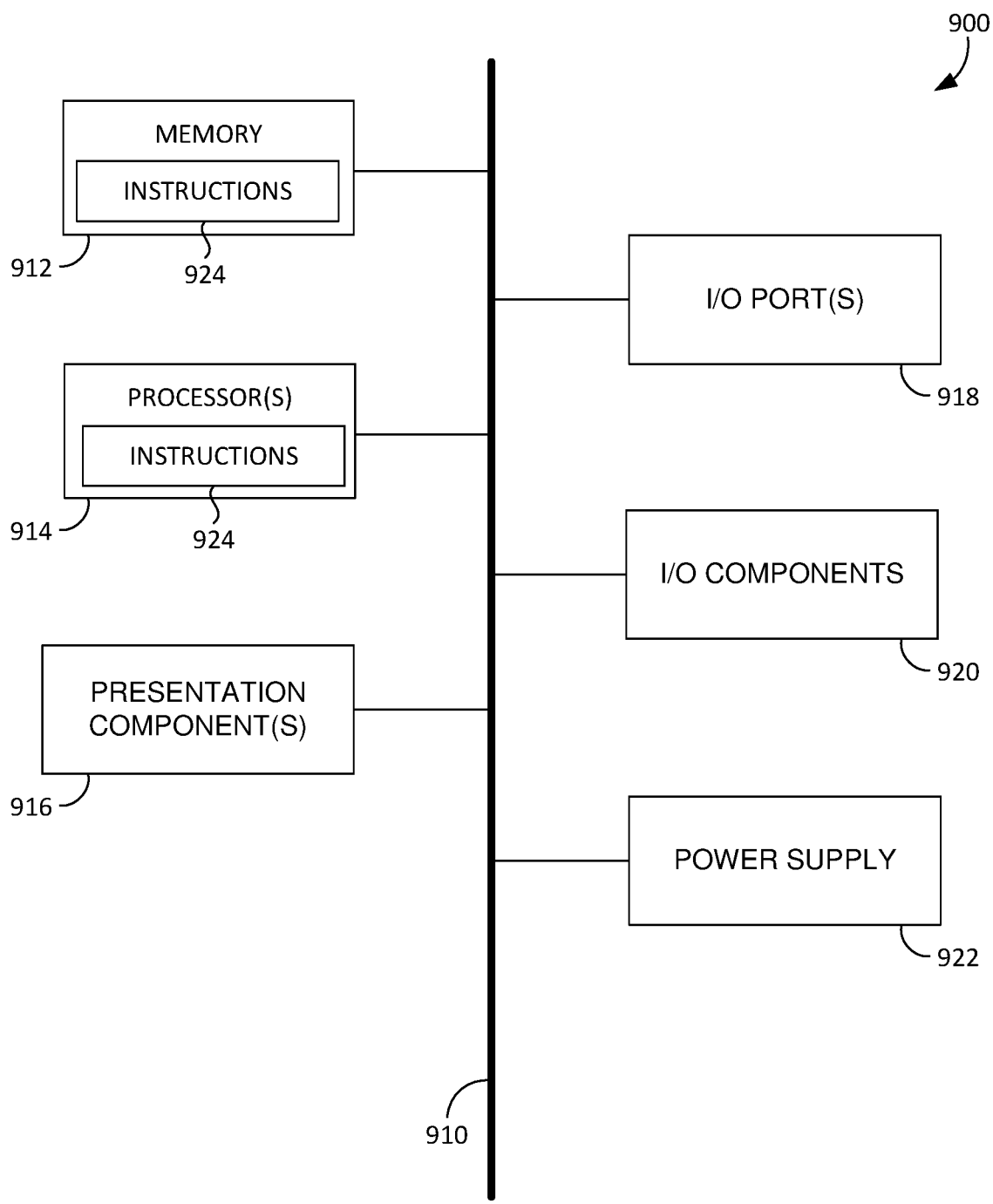
FIG. 9 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 900. Computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of computing device 900 to render immersive augmented reality or virtual reality.

Embodiments described herein facilitate the recording and producing of performance-based animated movies. Components described herein refer to integrated components of an animation production system. The integrated components refer to the hardware architecture and software framework that support functionality using the animation production system. The hardware architecture refers to physical components and interrelationships thereof, and the software framework refers to software providing functionality that can be implemented with hardware embodied on a device.

The end-to-end software-based animation production system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for generating an animation, the method comprising:
   accessing a script comprising an indication of animation events;
   parsing the script to identify the animation events;
   encoding the animation events into nodes of a story model;
   generating an animated movie during a performance of the script by:
      advancing through the story model a playhead that identifies active nodes of the story model, and identifying an associated portion of the performance;
      triggering, based on the identified portion of the performance, generation of the animation events associated with the active nodes;
      binding the generated animation events to corresponding ones of the active nodes; and
      assembling the generated animation events into an animated movie.

2. The method of claim 1, wherein the script indicates the animation events using syntax of a markup language comprising a trigger and at least one argument.

3. The method of claim 2, wherein the method further comprises compiling the script to identify errors in the syntax of the animation events.

4. The method of claim 1, wherein the script uses an extended markup language that embeds syntax for the animation events within comments of an existing markup language.

5. The method of claim 1, wherein the script specifies a timing element for at least one of the animation events, the timing element comprising at least one of a start time, a stop time, a duration, or a delay upon which to trigger the animation event during a performance, and wherein a corresponding one of the nodes of the story model indicates the timing element in an associated parameter of the node.

6. The method of claim 1, wherein the nodes of the story model comprise speech nodes and lip sync nodes, and wherein the method further comprises automatically generating the lip sync nodes to trigger lip syncs for the speech nodes during the performance.

7. The method of claim 1, wherein the performance comprises a vocal performance, and wherein the method further comprises:
   determining an alignment between a first portion of the vocal performance and a first portion of the script by matching transcribed words of the first portion of the vocal performance with words from the first portion of the script;
   determining a misalignment between a second portion of the vocal performance and a second portion of the script;
   matching, based on the determined misalignment, transcribed words of the second portion of the vocal performance with a command phrase from a set of pre-defined commands; and
   executing a function associated with the command phrase.

8. The method of claim 1, wherein the method further comprises:
   presenting the script on a teleprompter interface;
   causing the teleprompter interface to advance the script based on a determined alignment between the performance and the script.

9. The method of claim 1, wherein the method further comprises presenting the animated movie as a live preview on a stage interface during the performance.

10. The method of claim 1, wherein at least one of the nodes of the story model comprises an improvisation node, and wherein recording the performance further comprises:
    advancing the playhead to the improvisation node;
    recording a corresponding first portion of the performance comprising an improvisation; and
    determining that the improvisation is complete by detecting an alignment between transcribed words of a second portion of the performance and words of a speech node subsequent to the improvisation node.

11. The method of claim 1, wherein the performance comprises a vocal performance, and wherein recording the performance further comprises:
    determining a match between transcribed words of the vocal performance and a first speech node of the story model; and
    advancing the playhead to a second speech node of the story model, subsequent to the first speech node, based on determining the match.

12. The method of claim 1, wherein the animation events in the script comprise dialog, and wherein the method further comprises:
    parsing lines of the dialog into a set of contiguous sequences of words separated by consecutive animation events;
    generating a speech node for each of the contiguous sequences of words in the set;
    constructing a linear sequence of the speech nodes; and
    connecting adjacent speech nodes with directed edges.

13. The method of claim 1, wherein the story model is structured as a directed acyclic graph with parallel nodes triggered by a common speech node.

14. The method of claim 1, wherein one of the nodes of the story model comprises a motion node configured to trigger, during a corresponding portion of the performance, a character motion designated in an associated animation event in the script.

15. The method of claim 1, wherein one of the nodes of the story model comprises a camera node configured to trigger, during a corresponding portion of the performance, a camera transition designated in an associated animation event in the script.

16. The method of claim 1, wherein the performance comprises audio and a facial performance, and wherein generating the animation events comprises:
    recording, as a first of the generated animation events, a portion of the audio;
    generating, as a second of the generated animation events, a lip sync animation based on the portion of the audio;
    generating, as a third of the generated animation events, a facial expression animation based on a corresponding portion of the facial performance; and generating, as a fourth of the generated animation events, a hand gesture animation from a pre-defined animation.

17. One or more computer storage media storing computer-useable instructions that, when used by one or more computing devices, cause the one or more computing devices to perform operations comprising:
during a first take of a performance of a script comprising an indication of animation events:
advancing through a story model a playhead that identifies active nodes of a plurality of nodes of the story model;
capturing first audio of the first take of the performance; and
generating a first of the animation events based on the first take of the performance, wherein the first animation event comprises a non-speech event;
detecting, during the first take, a voice-based command by distinguishing the voice-based command from the first audio of the first take; and
executing the voice-based command.

18. The media of claim 17, wherein the voice-based command comprises a retake command, the operations further comprising recording a second take of the performance, based on detecting the retake command, by:
automatically repositioning the playhead;
capturing second audio of the second take of the performance starting at the repositioned playhead and associating the second audio with a corresponding speech node of the plurality of nodes during the second take; and
regenerating the first animation event based on the second take of the performance and associating the regenerated first animation event with a corresponding non-speech node of the plurality of nodes during the second take of the performance.

19. The media of claim 17, wherein the story model encodes a line of dialog of the script into a speech node, encodes an associated animation event of the animation events into a non-speech node, and connects the speech node and the non-speech node to a common parent node.

20. A computer system comprising:
one or more hardware processors and memory configured to provide computer program instructions to the one or more hardware processors;
a means for recording a performance of a script, wherein the performance comprises a vocal performance and a motion performance;
a teleprompter interface configured to use the one or more hardware processors to present and advance the script during the performance;
a text aligner configured to use the one or more hardware processors to cause the teleprompter interface to advance the script based on a determined alignment between the vocal performance and the script; and
a command parser configured to use the one or more hardware processors to:
match transcribed words of the vocal performance with a command phrase from a set of pre-defined commands; and
execute a function associated with the command phrase.

* * * * *